US008400439B2

(12) United States Patent
Morita

(10) Patent No.: US 8,400,439 B2
(45) Date of Patent: Mar. 19, 2013

(54) INTEGRATED CIRCUIT DEVICE, ELECTRO OPTICAL DEVICE AND ELECTRONIC APPARATUS

(75) Inventor: Akira Morita, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 444 days.

(21) Appl. No.: 12/696,497

(22) Filed: Jan. 29, 2010

(65) Prior Publication Data

US 2010/0194718 A1 Aug. 5, 2010

(30) Foreign Application Priority Data

Feb. 4, 2009 (JP) ................................ 2009-023197

(51) Int. Cl.
*G06F 3/038* (2006.01)
(52) U.S. Cl. ........... 345/204; 345/98; 345/690; 345/209
(58) Field of Classification Search ................... 345/204
See application file for complete search history.

(56) References Cited

U.S. PATENT DOCUMENTS

| | | | | |
|---|---|---|---|---|
| 4,168,488 | A * | 9/1979 | Evans | 382/297 |
| 2004/0085283 | A1* | 5/2004 | Wang | 345/100 |
| 2005/0041488 | A1* | 2/2005 | Ito et al. | 365/199 |
| 2006/0227628 | A1* | 10/2006 | Eriguchi et al. | 365/189.07 |
| 2006/0262070 | A1* | 11/2006 | Lee | 345/98 |
| 2009/0002299 | A1* | 1/2009 | Tsuchihashi | 345/88 |
| 2009/0015519 | A1* | 1/2009 | Hori | 345/60 |
| 2009/0079767 | A1* | 3/2009 | Morita | 345/690 |
| 2010/0128011 | A1* | 5/2010 | Ito | 345/209 |

FOREIGN PATENT DOCUMENTS

| | | | | |
|---|---|---|---|---|
| JP | A-2004-45967 | | | 2/2004 |
| JP | 2008203826 | A | * | 9/2008 |
| JP | A-2008-203826 | | | 9/2008 |
| JP | 2008233454 | A | * | 10/2008 |
| JP | A-2008-233454 | | | 10/2008 |

* cited by examiner

*Primary Examiner* — Sumati Lefkowitz
*Assistant Examiner* — Jose Soto Lopez
(74) *Attorney, Agent, or Firm* — Oliff & Berridge, PLC

(57) ABSTRACT

An integrated circuit device includes: a data line driving circuit provided for each of a plurality of data signal supply lines that supplies a multiplexed data signal to a corresponding data signal supply line; an order offset register that stores a first order offset setting value; an order setting circuit that sets the order of driving the first pixel; and an order offset addition circuit corresponding to the data line driving circuit. When the data line driving circuit drives the q-th (q is a natural number less than p) pixel in the r-th (r is a natural number less than p) place in the order, the order offset addition circuit processes addition of an order offset correction value based on the r-th order offset setting value among the first order offset setting value.

10 Claims, 24 Drawing Sheets

| Driving order | r-th place in the order | 1 | 2 | 3 | 4 | 5 | 6 | 7 | 8 |
|---|---|---|---|---|---|---|---|---|---|
| Pixel | (Pqi) | P1i | P5i | P3i | P7i | P2i | P6i | P4i | P8i |
| JS | (q) | 1 | 5 | 3 | 7 | 2 | 6 | 4 | 8 |
| QGDi | (GDqi) | GD1i | GD5i | GD3i | GD7i | GD2i | GD6i | GD4i | GD8i |
| MCOUNT | (r) | 1 | 2 | 3 | 4 | 5 | 6 | 7 | 8 |
| QOJ | (OJr) | OJ1 | OJ2 | OJ3 | OJ4 | OJ5 | OJ6 | OJ7 | OJ8 |
| Data line | (Sqi) | S1i | S5i | S3i | S7i | S2i | S6i | S4i | S8i |

FIG. 8

| Driving order | | 1 | 2 | 3 | 4 | 5 | 6 | 7 | 8 |
|---|---|---|---|---|---|---|---|---|---|
| Pixel | (Pqi) | P1i | P5i | P3i | P7i | P2i | P6i | P4i | P8i |
| JS | (q) | 1 | 5 | 3 | 7 | 2 | 6 | 4 | 8 |
| QGDi | (GDqi) | GD1i | GD5i | GD3i | GD7i | GD2i | GD6i | GD4i | GD8i |
| QOG | (OGq) | OG1 | OG5 | OG3 | OG7 | OG2 | OG6 | OG4 | OG8 |
| Data line | (Sqi) | S1i | S5i | S3i | S7i | S2i | S6i | S4i | S8i |

D1 D2 D3 D4 D5 D6

FIG. 13

FIG. 16A

H1 H2 H3

| HC[2:0] | | 0 | | | | | | | |
|---|---|---|---|---|---|---|---|---|---|
| MC[2:0] | | 0 | 1 | 2 | 3 | 4 | 5 | 6 | 7 |
| Q[2:0] | Decimal | 0 | 1 | 2 | 3 | 4 | 5 | 6 | 7 |
| | Binary | 000 | 001 | 010 | 011 | 100 | 101 | 110 | 111 |
| ROT[2:0] | Binary | 000 | 100 | 010 | 110 | 001 | 101 | 001 | 111 |
| | Decimal | 0 | 4 | 2 | 6 | 1 | 5 | 3 | 7 |

FIG. 16B

| HC[2:0] | 0 | | | | | | 1 | | | | | | ··· | 7 | | | | | |
|---|---|---|---|---|---|---|---|---|---|---|---|---|---|---|---|---|---|---|---|
| MC[2:0] | 0 | 1 | 2 | 3 | ··· | 7 | 0 | 1 | 2 | 3 | ··· | 7 | ··· | 0 | 1 | 2 | 3 | ··· | 7 |
| Q[2:0] | 0 | 1 | 2 | 3 | ··· | 7 | 1 | 2 | 3 | 4 | ··· | 0 | ··· | 7 | 0 | 1 | 2 | ··· | 6 |
| ROT[2:0] | 0 | 4 | 2 | 6 | ··· | 7 | 4 | 2 | 6 | 1 | ··· | 0 | ··· | 7 | 0 | 4 | 2 | ··· | 3 |

H4 H5

FIG. 17A

| MC[2:0] | RS1 | RS2 | RS3 | RS4 | … | RS8 |
|---|---|---|---|---|---|---|
| 0 | 1 | 0 | 0 | 0 | … | 0 |
| 1 | 0 | 1 | 0 | 0 | … | 0 |
| 2 | 0 | 0 | 1 | 0 | … | 0 |
| 3 | 0 | 0 | 0 | 1 | … | 0 |
| ⋮ | ⋮ | ⋮ | ⋮ | ⋮ | ⋮ | ⋮ |
| 7 | 0 | 0 | 0 | 0 | … | 1 |

FIG. 17B

| HC[2:0] | OE1 | OE2 | OE3 | OE4 | … | OE8 |
|---|---|---|---|---|---|---|
| 0 | 1 | 0 | 0 | 0 | … | 0 |
| 1 | 0 | 1 | 0 | 0 | … | 0 |
| 2 | 0 | 0 | 1 | 0 | … | 0 |
| 3 | 0 | 0 | 0 | 1 | … | 0 |
| ⋮ | ⋮ | ⋮ | ⋮ | ⋮ | ⋮ | ⋮ |
| 7 | 0 | 0 | 0 | 0 | … | 1 |

INTEGRATED CIRCUIT DEVICE, ELECTRO OPTICAL DEVICE AND ELECTRONIC APPARATUS

The entire disclosure of Japanese Patent Application No. 2009-23197, filed Feb. 4, 2009 is expressly incorporated by reference herein.

BACKGROUND

1. Technical Field

An aspect of the present invention relates to integrated circuit devices, electro optical devices and electronic apparatuses.

2. Related Art

In recent years, high definition imaging technology such as high vision imaging have become popular, and higher definition and higher multiple grayscale levels are being pursued for display apparatuses such as liquid crystal projectors and the like. As higher definition and higher multiple grayscale are progressed, the higher the multiple grayscale levels, the smaller the grayscale voltage for each grayscale level becomes, which causes a problem in which display irregularity would occur even when a small error occurs in data voltages.

The applicant has developed a multiplex driving type driver in which each data line driving circuit writes data voltages for a plurality of pixels in each one horizontal scanning period. However, the driver of this type entails a problem in which offsets are generated in the multiple data voltages to be multiplex driven. Due to errors caused by these offsets, there is a problem in that display irregularity (streaks) is generated in the displayed image.

For example, JP-A-2004-45967 (Patent Document 1) describes a method for averaging errors in data voltages by switching the order of driving a plurality of data lines to be multiplex-driven in each of the horizontal scanning periods.

SUMMARY

In accordance with some embodiments of the invention, integrated circuit devices, electro optical devices and electronic apparatuses that can prevent display irregularity can be provided.

An embodiment of the invention pertains to an integrated circuit device having; a data line driving circuit that is provided for each of a plurality of data signal supply lines and supplies a multiplexed (time-division multiplexed) data signal to a corresponding data signal supply line among the plurality of data signal supply lines; an order offset register that stores a first order offset setting value—a p-th order offset setting value corresponding to order offsets that are offsets generated in a plurality of data signals, depending on the order of driving a first pixel—a p-th pixel, when a plurality of data signals after demultiplexing obtained by demultiplexing the multiplexed data signal with a demultiplexer are supplied to a plurality of pixels in one horizontal scanning period; an order setting circuit that sets an order of driving the first pixel—the p-th pixel; and an order offset addition circuit corresponding to the data line driving circuit, wherein, when the data line driving circuit drives, among the first pixel—the p-th pixel, the q-th (q is a natural number less than p) pixel in the r-th (r is a natural number less than p) place in the order, the order offset addition circuit processes addition of an order offset correction value based on the r-th order offset setting value among the first order offset setting value—the p-th order offset setting value to the q-th image data among the first image data—the p-th image data.

Here, when the plurality of data signals after demultiplexing are supplied to a plurality of pixels in one horizontal scanning period, order offsets that are offsets differing one from the other depending on the order of driving the pixels are generated in the plurality of data signals (data voltages or data currents).

In accordance with an aspect of the embodiment of the invention, as the order offset register stores the first—p-th order offset setting values correlated to the first—p-th places in the driving order, the order setting circuit sets an order of driving the first—p-th pixels, and the data line driving circuit drives the q-th pixel in the r-th place in the order according to the driving order, the order offset addition circuit obtains an order offset correction value corresponding to the r-th place in the driving order based on the r-th order offset setting value, processes addition of the position offset correction value to the q-th image data, and outputs the addition-processed image data to the data line driving circuit.

In this manner, in accordance with an aspect of the embodiment of the invention described above, the order offset register stores the first—p-th order offset setting values correlated to the first—p-th places in the driving order, and the order setting circuit sets an order of driving the first—p-th pixels. By so doing, the order of driving the first—p-th pixels is set, and an order offset correction value corresponding to the r-th place in the driving order can be obtained based on the r-th order offset setting value OJr.

Also, in accordance with an aspect of the embodiment of the invention, when the data line driving circuit drives the q-th pixel in the r-th place in the driving order according to the set driving order, the order offset addition circuit processes addition of an order offset correction value corresponding to the r-th place in the driving order to the q-th image data. By this, order offsets that differ one from the other depending on the order of driving the first—p-th pixels can be corrected. In this manner, display irregularities clue to order offsets in data signals can be prevented.

Also, in one aspect, the embodiment of the invention may include a switch signal generation circuit that generates a demultiplexing switch signal for controlling on and off of a plurality of demultiplexing switch elements included in the demultiplexer.

By so doing, switching on and off of the plurality of demultiplexing switch elements included in the demultiplexer can be controlled. By this, multiplexed data signals can be demultiplexed by the demultiplexer.

For example, the demultiplexer may be included in an electro optical panel, and the demultiplexing switch signal may be supplied to the demultiplexer within the electro optical panel, whereby demultiplexing of the data signal may be realized. Alternatively, the demultiplexer may be included in an integrated circuit device in accordance with the present invention, and the demultiplexing switch signal may be supplied to the demultiplexer within the integrated circuit device, whereby demultiplexing of the data signal may be realized.

Also, in accordance with an aspect of the embodiment of the invention, the order offset register may store a first order offset constant value—a p-th order offset constant value as the first order offset setting value—the p-th order offset setting value, and the order offset addition circuit may process addition of the r-th order offset constant value among the first order offset constant value—the p-th order offset constant value as the order offset correction value to the q-th image data.

In this manner, in accordance with an aspect of the embodiment of the invention, the process of adding the r-th order offset constant value as the order offset correction value to the q-th image data corresponding to the q-th pixel to be driven in the r-th place in the order is executed. By so doing, order offset correction values corresponding to the first—p-th places in the driving order can be obtained based on the first—p-th order offset setting values.

Also, in accordance with an aspect of the embodiment of the invention, the order offset register may store a first order offset coefficient value—a p-th order offset coefficient value as the first order offset setting value—the p-th order offset setting value, and the order offset addition circuit may process addition of a value obtained by multiplying the r-th order offset coefficient value among the first order offset coefficient value—the p-th order offset coefficient value with the q-th image data, as the order offset correction value, to the q-th image data.

In this manner, in accordance with an aspect of the embodiment of the invention, the process of addition of a value obtained by multiplying the r-th order offset coefficient value with the q-th image data, as the order offset correction value, to the q-th image data corresponding to the q-th pixel to be driven in the r-th place in the order is executed. By so doing, based on the first—p-th order offset setting values, order offset correction values corresponding to the first—p-th places in the driving order can be obtained. Also, even when the characteristic of order offsets has an inclination with respect to the grayscales of image data, the inclination can be corrected.

Also, in one aspect, the embodiment of the invention may include an output selection circuit that is provided corresponding to each of the data line driving circuits and selects and outputs, based on a pixel selection signal from the order setting circuit, one of the image data among the first image data—the p-th image data, wherein, when each of the data line driving circuits drives the q-th pixel in the r-th place in the order, the output selection circuit may, upon receiving the pixel selection signal instructing to select the q-th pixel, output the q-th image data, and the order offset addition circuit may process addition of an order offset correction value based on the r-th order offset setting value to the q-th image data.

By so doing, when the q-th pixel is to be driven in the r-th place in the order, it is possible to process addition of an order offset correction value based on the r-th order offset setting value corresponding to the r-th place in the driving order to the q-th image data corresponding to the q-th pixel. By this, order offsets in the data signals to be written to the respective pixels can be corrected based on the order offset setting values correlated to the order of driving the pixels.

Also, in one aspect, the embodiment of the invention may include a multiplex counter that counts the number of clocks of a demultiplexing clock for demultiplexing, a horizontal synchronization counter that counts the number of horizontal synchronization signals, an addition circuit that processes addition of a count value of the multiplex counter and a count value of the horizontal synchronization counter and outputs an added count value, and a decoder that, upon receiving rotation data in which a lower bit sequence of the added count value is inverted to an upper bit sequence and an upper bit sequence of the added count value is inverted to a lower bit sequence, decodes the rotation data, and outputs the pixel selection signal.

In this manner, the order setting circuit can set the order of driving pixels, and a pixel selection signal that instructs as to which one of image data among the first—p-th image data should be selected can be outputted. Also, in multiplex driving, it is possible to perform a rotation to set a different pixel driving order in each of the horizontal scanning periods.

Also, in another aspect, the embodiment of the invention may include a correction data calculation section that calculates correction data for correcting variations in output voltages of the plurality of data line driving circuits, a plurality of correction circuits that correct image data based on the correction data and outputs the image data corrected to corresponding data line driving circuits among the plurality of data line driving circuits, and a comparator, wherein the comparator may compare an output voltage of those of the data line driving circuits to be corrected among the plurality of data line driving circuits with a comparator reference voltage, and the correction data calculation section may calculate the correction data for correcting variation in the output voltage of the data line driving circuit to be corrected based on comparison results provided by the comparator.

Here, when output voltages of the data line driving circuits have variations, the luminance varies in each of the image regions driven by each of the data line driving circuits, whereby luminance irregularity and color irregularity occurs in displayed images.

In this respect, in accordance with an aspect of the embodiment of the invention, the correction circuits correct image data based on correction data, whereby variations in output voltages of the data line driving circuits can be corrected. By this, display irregularity due to variations in output voltages of the data line driving circuits can be prevented.

Also, in accordance with an aspect of the embodiment of the invention the comparator compares output voltages of the data line driving circuits with a comparator reference voltage, and the correction data calculation section calculates correction data for correcting variations in output voltages of the data line driving circuits based on the results of comparison. By so doing, the correction data can be obtained while measuring variations in real time.

Another embodiment of the invention pertains to an electro optical device that includes any one of the integrated circuit devices described above.

Also, in accordance with still another embodiment of the invention, there may be provided an electro optical panel, wherein the electro optical panel may include a plurality of pixels in which a plurality of data signals after demultiplexing are supplied, the plurality of data lines corresponding to the plurality of pixels, a plurality of demultiplexing switch elements for demultiplexing the multiplexed data signal, and a plurality of signal lines that are arranged in a first direction for controlling on and off of the plurality of demultiplexing switch elements.

In accordance with the embodiment of the invention described above, when such an electro optical panel is included, position offsets in data signals can be corrected. More concretely, order offsets in data signals that may be caused by leak currents or the like of the plurality of switch elements can be corrected.

Also, yet another embodiment of the invention pertains to an electronic apparatus that includes any one of the electro optical devices described above.

BRIEF DESCRIPTION OF THE DRAWINGS

FIG. 8 is a table for describing operations of the first exemplary composition in accordance with the embodiment of the invention.

FIG. 13 is a table for describing operations of the second exemplary composition in accordance with the embodiment of the invention.

FIGS. 16A and 16B are tables for describing operations of the order setting circuit.

FIGS. 17A and 17B are tables for describing operations of the order setting circuit.

DESCRIPTION OF EXEMPLARY EMBODIMENTS

Preferred embodiments of the invention are described in detail below. It is noted that the embodiments described below do not unduly limit the content of the invention recited in the scope of the claimed invention, and all of the compositions to be described in the embodiments may not necessarily be indispensable as means for solution provided by the invention.

1. Multiplex Drive 1.1. Exemplary Composition of Liquid Crystal Display Device

Referring to FIGS. 1-4, multiplex drive (line sequential drive) performed by the present embodiment will be described.

Hereinbelow, an example in which a single color display liquid crystal panel that may be used for a liquid crystal projector and the like is driven by a driver (an integrated circuit device) will be described. However, in accordance with an embodiment of the invention, a liquid crystal panel that displays multiple colors such as RGB may be driven by a driver. Also, in accordance with an embodiment of the invention, an electro optical panel other than a liquid crystal panel may be driven by a driver. For example, an EL (electro-luminescence) panel, such as, for example, an organic EL panel, an inorganic EL panel or the like may be driven by a driver.

Also, an embodiment in which data voltages are supplied as data signals to data signal supply lines to be described below will be described as an example. However, in accordance with the embodiment of the invention, data currents may be supplied as data signals to the data signal supply lines.

Figure 1:
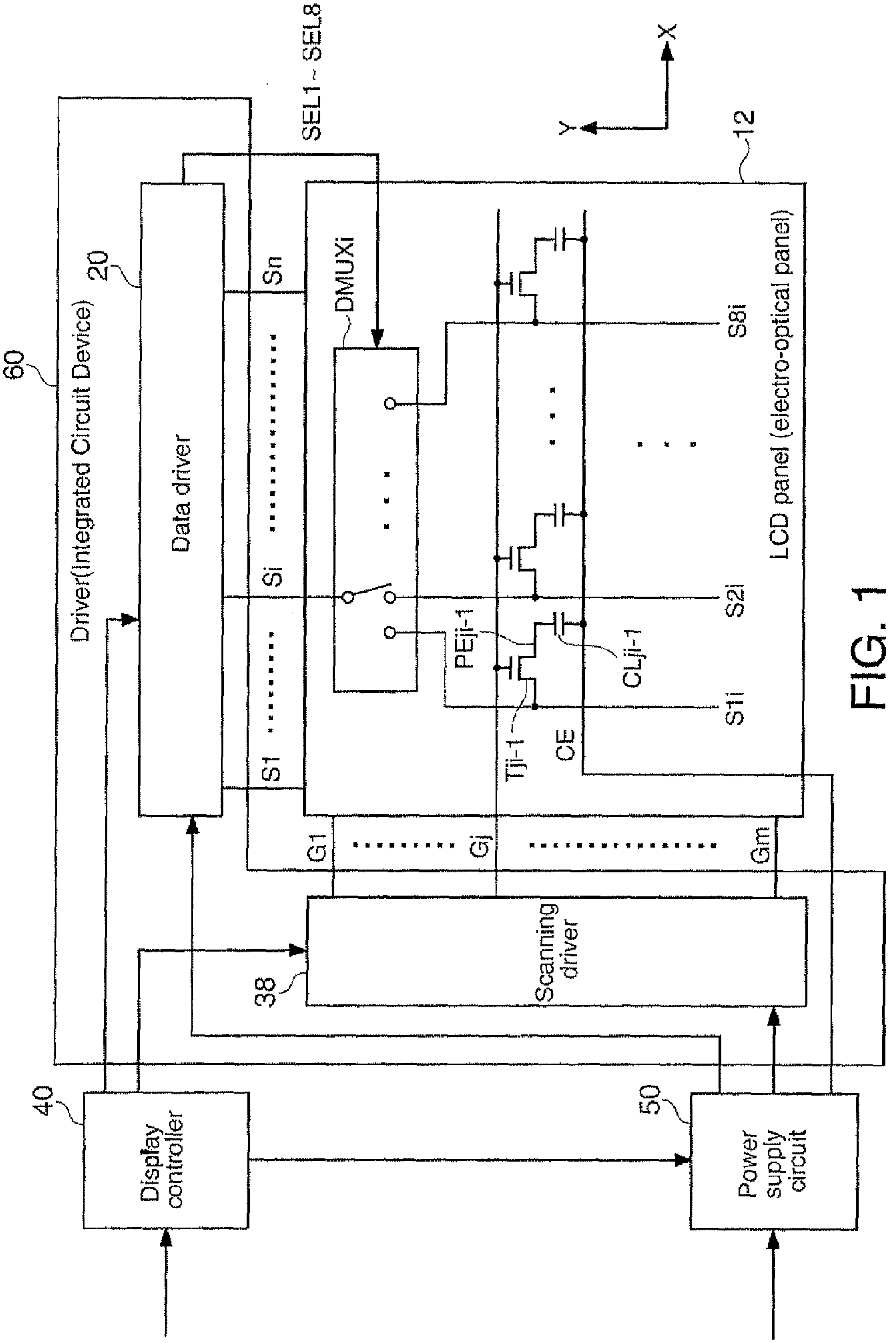
FIG. 1 is a diagram of an example of the composition of a liquid crystal display device.

FIG. 1 shows an exemplary composition of a liquid crystal display device (LCD or an electro optical device in a broader sense). The exemplary composition shown in FIG. 1 includes a liquid crystal panel 12 (an electro optical panel in a broader sense), a driver 60 (an integrated circuit device), a display controller 40, and a power supply circuit 50. It is noted that the liquid crystal display device in accordance with the invention is not limited to the composition shown in FIG. 1, and many modifications including omission of a portion of the components (for example, the display controller or the like), addition of other components and the like are possible. For example, FIG. 1 shows an example in which a demultiplexer to be described below is included in a liquid crystal panel. However, in accordance with another embodiment of the invention, the demultiplexer may be included in a data driver 20 to be described below.

The liquid crystal panel 12 may be comprised of, for example, an active matrix type liquid crystal panel. The liquid crystal panel 12 has a liquid crystal substrate (for example, a glass substrate), on which scanning lines G1-Gm (m is a natural number of 2 or greater) arranged in plurality in Y direction of FIG. 1, and extending in X direction are disposed. Also, data lines S11-S81, S12-S82, . . . , S1*n*-S8*n* (n is a natural number of 2 or greater) arranged in plurality in X direction, and extending in Y direction are disposed on the liquid crystal substrate. Furthermore, on the liquid crystal substrate are provided data signal supply lines S1-Sn (data voltage supply lines or data current supply lines) and demultiplexers DMUX1-DMUXn corresponding to the data signal supply lines, respectively.

Also, thin film transistors at positions corresponding to intersections between the scanning lines G1-Gm (gate lines) and data lines S11-S81, S12-S82, . . . , S1*n*-S8*n* (source lines) are provided on the liquid crystal substrate. For example, a thin film transistor Tji-1 is provided at the position corresponding to an intersection between the scanning line Gj (j is a natural number less than m) and the data line S1*i* (i is a natural number less than n).

Then, for example, the thin film transistor Tji-1 has a gate electrode that is connected to the scanning line Gj, a source electrode connected to the data line S1*i*, and a drain electrode connected to a pixel electrode PEji-1. A liquid crystal capacitance CLji-1 (a liquid crystal element, an electro optical element in a broader sense) is formed between the pixel electrode PEji-1 and a counter electrode CD (common electrode).

The demultiplexers DMUX1-DMUXn divide (separate, demultiplex) time-division data voltage (or data current, data signal in a broader sense) supplied to the data signal supply line (source voltage supply line) and supply the same to the data lines. More concretely, the demultiplexer DMUXi includes switch elements (a plurality of demultiplex switch elements) corresponding to the respective data lines. The switch elements are controlled to turn on and off by demultiplex switch signals SEL1-SEL8 (multiplex control signals) from the data driver 20, whereby the data voltage (source voltage) supplied to the data signal supply line Si is divided and supplied to the data lines S1*i*-S8*i*.

It is noted that FIG. 1 shows only the demultiplexer DMUXi and the data lines S1*i*-S8*i* corresponding to the data signal supply line Si, for the sake of simplification of the description. Also, only the thin film transistors provided at the positions corresponding to intersections between the data lines S1*i*-S8*i* and the scanning line Gj are shown. However, demultiplexers and data lines for other data signal supply lines and thin film transistors provided at positions corresponding to intersections of other data lines and scanning lines are similarly provided.

The data driver 20 outputs time division data voltage to the data signal supply lines S1-Sn based on image data (grayscale data), thereby driving the data signal supply lines S1-Sn. On the other hand, the scanning driver 38 scans (sequentially drives) the scanning lines G1-Gm of the liquid crystal panel 12.

The display controller 40 controls the data driver 20, the scanning driver 38 and the power supply circuit 50. For example, the display controller 40 sets operation modes, supplies vertical synchronization signals and horizontal synchronization signals generated therein to the data driver 20 and the scanning driver 38. The display controller 40 performs controlling of the above according to contents set by, for example, an unshown host controller (for example, a central processing unit (CPU)).

The power supply circuit 50 generates various voltage levels (for example, reference voltages for generating grayscale voltages) necessary for driving the liquid crystal panel 12, voltage levels of counter electrode voltages VCOM on the counter electrode CE, based on the reference voltage (power supply voltage) supplied from outside.

Referring to FIG. 1, an example in which the data voltages are supplied to eight data lines from one data signal supply line in the single color display liquid crystal panel is described. However, in accordance with the invention, the data voltage may be supplied to a different number of data lines from one data signal supply line. For example, in accordance with an aspect of the invention, in the case of an RGB display liquid crystal panel, data voltage may be supplied from one data signal supply line to six data lines corresponding to R1, G1, B1, R2, G2 and B3.

1.2. Data Driver

Figure 2:
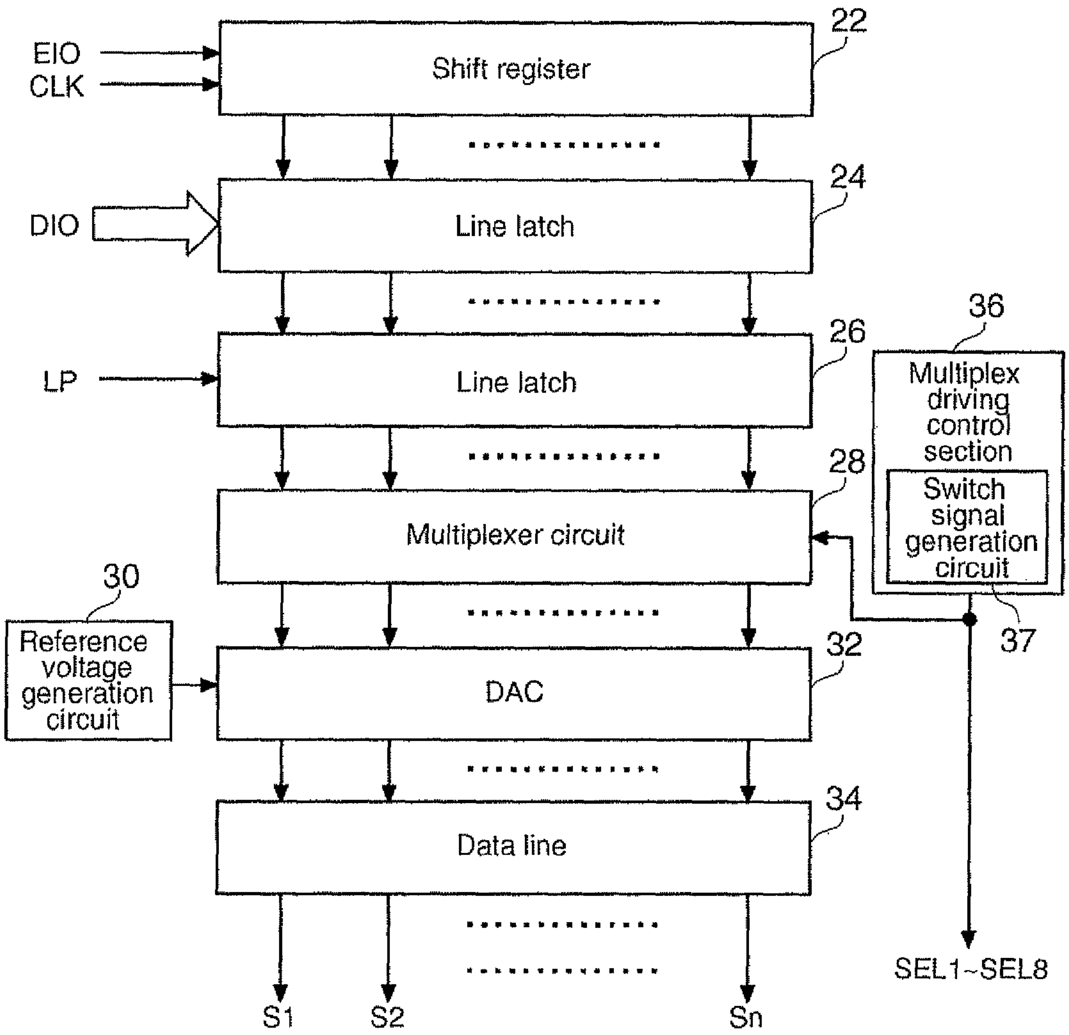
FIG. 2 is a diagram of an example of the composition of a data driver.

FIG. 2 shows an exemplary composition of the data driver 20 shown in FIG. 1. The data driver 20 includes a shift register 22, line latches 24, 26, a multiplexer circuit 28, a reference voltage generation circuit 30 (a grayscale voltage generation circuit), a DAC 32 (digital-to-analog converter, a data voltage generation circuit in a broader sense), a data line driving circuit 34 and a multiplex drive control section 36.

The shift register 22 is provided for each of the data lines, and includes a plurality of sequentially connected flip-flops. The shift register 22 operates in synchronism with a clock signal CLK, and upon retaining an enable I/O signal EIO at the leading flip-flop, sequentially shifts the enable I/O signal EIO to an adjacent one of the flip-flops.

Image data DIO (grayscale data) is inputted in the line latch 24. The line latch 24 latches the image data DIO in synchronism with the enable I/O signal EIO that is sequentially shifted, inputted from the shift register 22.

The line latch 26 latches image data latched by the line latch 24 for the unit of one horizontal scanning, in synchronism with horizontal synchronization signals LP.

It is noted that the clock signal CLK, the enable I/O signal MO, the image data DIO and horizontal synchronization signals LP are inputted from, for example, the display controller 40.

The multiplexer circuit 28, upon receiving image data corresponding to each data line from the line latch 26, time-division multiplexes the image data corresponding to eight data lines, and outputs the time-division multiplexed image data corresponding to each of the data signal supply lines. The multiplexer circuit 28 multiplexes image data based on multiplex control signals SEL1-SEL8 from the multiplex drive control section 36.

The multiplex drive control section 36 generates multiplex control signals SEL 1-SEL 8 that specify the timing of time-division of data voltages. More specifically, the multiplex drive control section 36 includes a switch signal generation circuit 37, and the switch signal generation circuit 37 generates multiplex control signals SEL1-SEL8. Then, the multiplex drive control section 36 supplies the multiplex control signals SEL1-SEL8 as demultiplex switch signals to the demultiplexers DMUX1-DMUXn.

The reference voltage generation circuit 30 generates a plurality of reference voltages (grayscale voltages), and supplies the same to the DAC 32. The reference voltage generation circuit 30 generates a plurality of reference voltages based on, for example, a voltage level supplied from the power supply circuit 50.

The DAC 32 generates analog grayscale voltages to be supplied to each of the data lines based on digital image data. More specifically, the DAC 32 receives the time-division multiplexed image data from the multiplexer circuit 28 and the plurality of reference voltages from the reference voltage generation circuit 30, and generates time-division multiplexed grayscale voltages corresponding to the time-division multiplexed image data.

The data line driving circuit 34 buffers (impedance-converts) the grayscale voltages from the DAC 32 and outputs data voltages to the data signal supply lines S1-Sn, thereby driving the data lines S11-S81, S12-S82, . . . , S1*n*-S8*n*. For example, the data line driving circuit 34 buffers the grayscale voltages with a voltage-follower connected operation amplifier provided at each of the data signal supply lines.

1.3. Operations of Multiplex Driving

Figure 3:
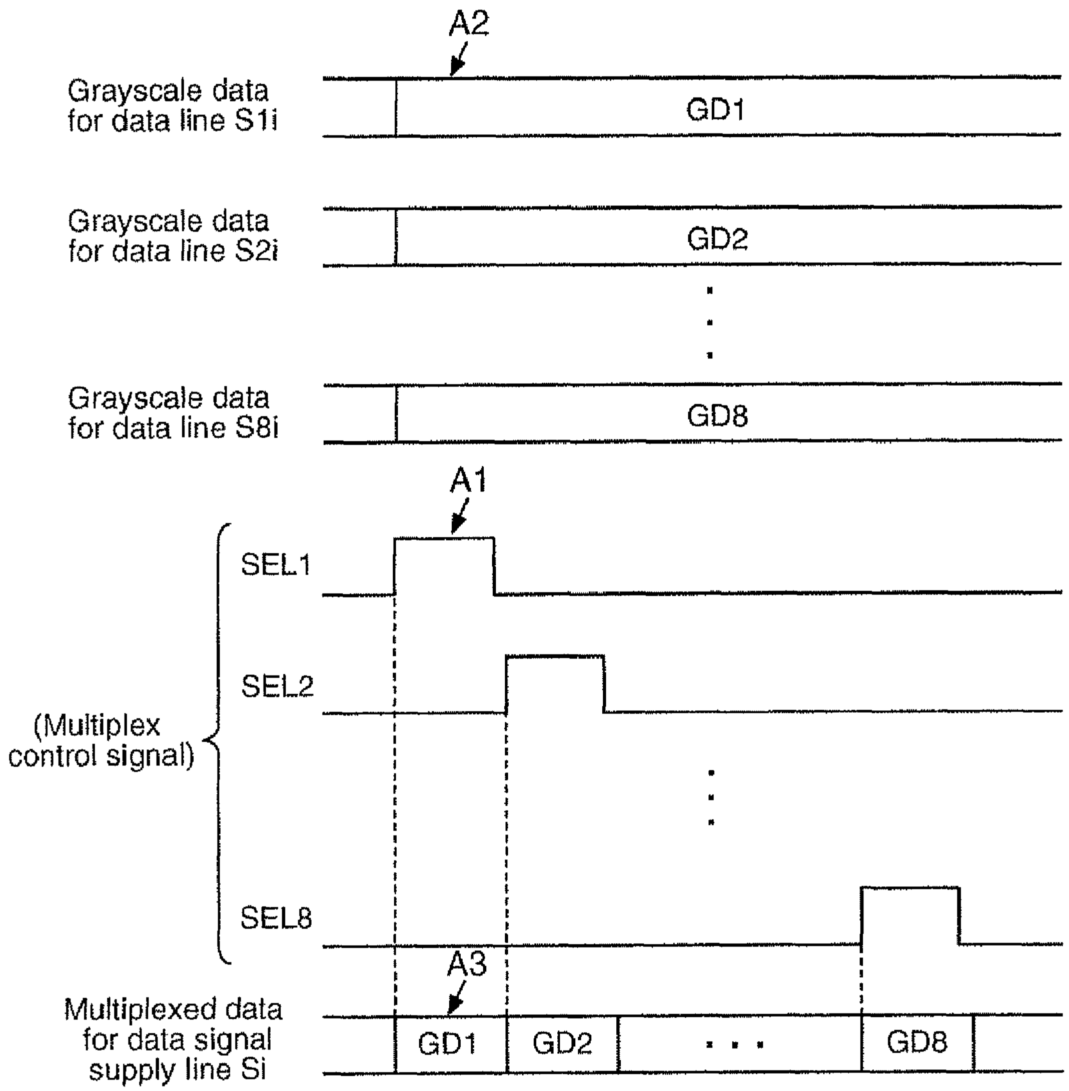
FIG. 3 is a chart for describing operations of a multiplex drive.
Figure 4:
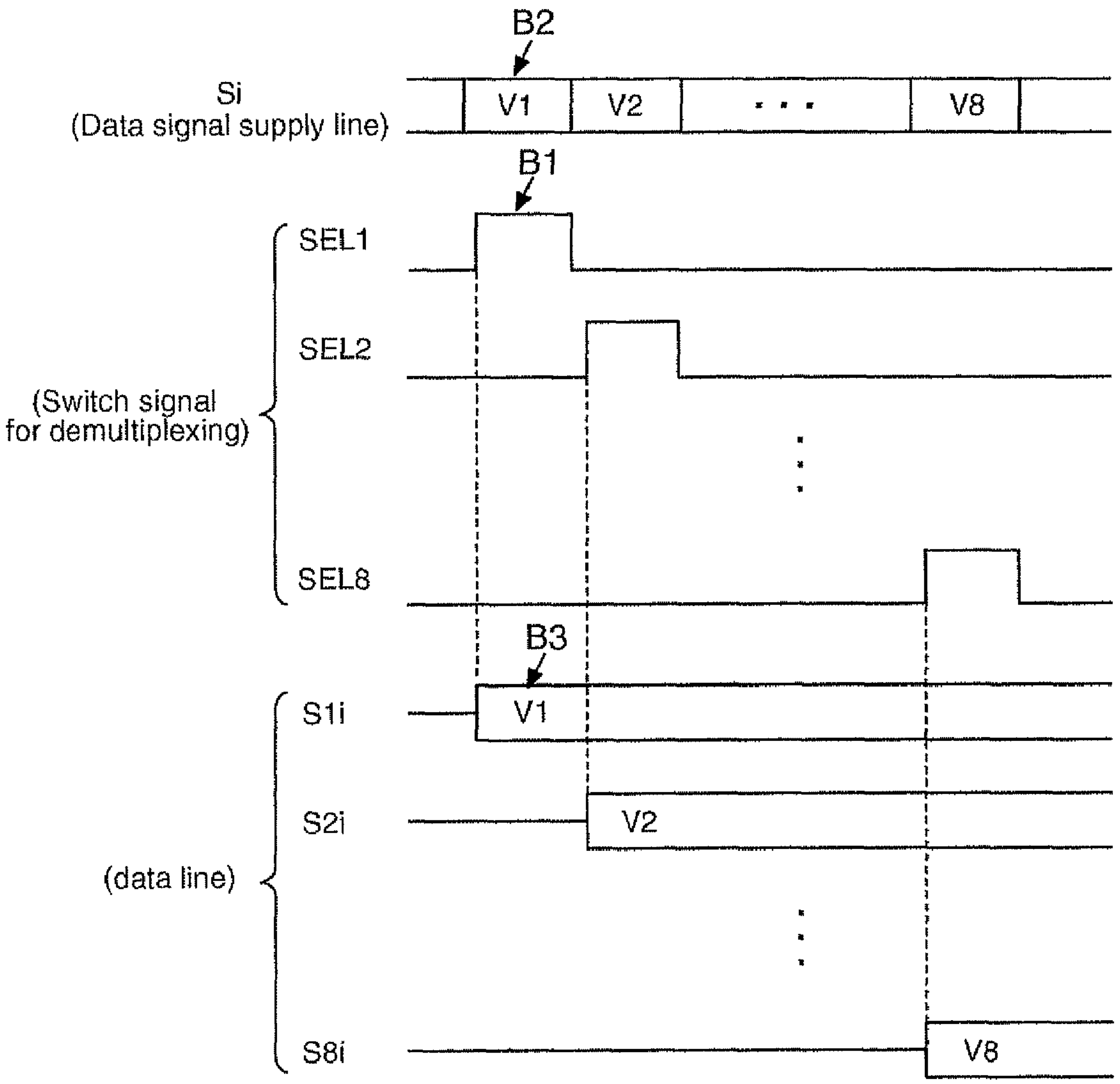
FIG. 4 is a chart for describing operations of a multiplex drive.

FIGS. 3 and 4 show charts for describing operations of the multiplex driving circuit 36. It is noted that, referring to FIGS. 3 and 4, an example of operations of the demultiplexer DMUXi is described. However, the description thereof is similarly applicable to the other demultiplexers.

FIG. 3 shows a chart for explaining operations of the multiplexer circuit 28. As shown in FIG. 3, as the image data for the data lines S1*i*-S8*i*, image data GD1-GD8 are latched by the line latch 26.

When the multiplex control signal SEL1 becomes active as indicated by A1 in FIG. 3, the multiplexer circuit 28 selects the image data GD1 indicated at A2, as indicated by A3 and outputs the same. Then, when the multiplex control signal SEL2 becomes active, the multiplexer circuit 28 selects and outputs the image data GD2. When the multiplex control signal SEL8 becomes active, the multiplexer circuit 28 selects and outputs the image data GD8.

In this manner, the multiplexer circuit 28 generates multiplex data of the image data GD1-GD8 that are time-division multiplexed, based on the multiplex control signals SEL1-SEL8, each of which becomes active once in each one horizontal scanning period.

Upon receiving the time-division multiplexed image data GD1-GD8, the DAC 32 selects a grayscale voltage corresponding to each of the image data from among the reference voltages (grayscale voltages) and outputs the same. Then, the DAC 32 outputs the time-division multiplexed image data.

FIG. 4 is a chart for describing operations of the demultiplexer DMUXi. As shown in FIG. 4, upon receiving the multiplexed grayscale voltage from the DAC, the data line driving circuit 34 outputs multiplexed data voltages V1-V8 in one horizontal scanning period.

Then, the demultiplexer DMUXi outputs the data voltage V1 indicated by B2 to the data line S1*i* as indicated by B3, when the multiplex control signal SEL1 is active as indicated by B1 in FIG. 4. Similarly, the demultiplexer DMUXi outputs the data voltage V2 to the data line S2*i* when the multiplex control signal SEL2 is active, and outputs the data voltage V8 to the data line S8*i* when the multiplex control signal SEL8 is active.

In this manner, the demultiplexer DMUXi separates the multiplexed data voltages V1-V8 supplied to the data signal supply line Si, and outputs the same to the data lines S1*i*-S8*i*.

2. Order Offset Correction 2.1. Order Offset

Figure 5:
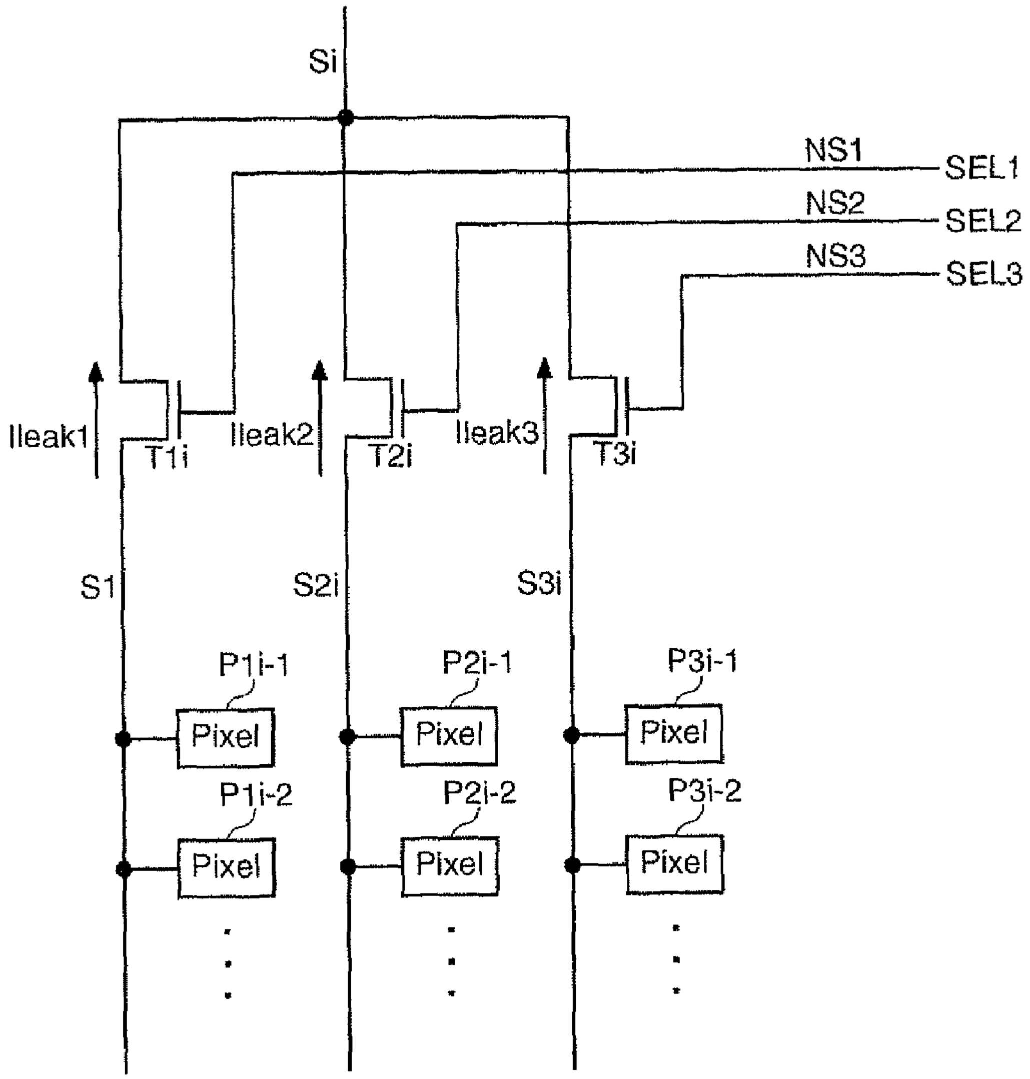
FIG. 5 is a diagram for describing order offsets.
Figure 6:
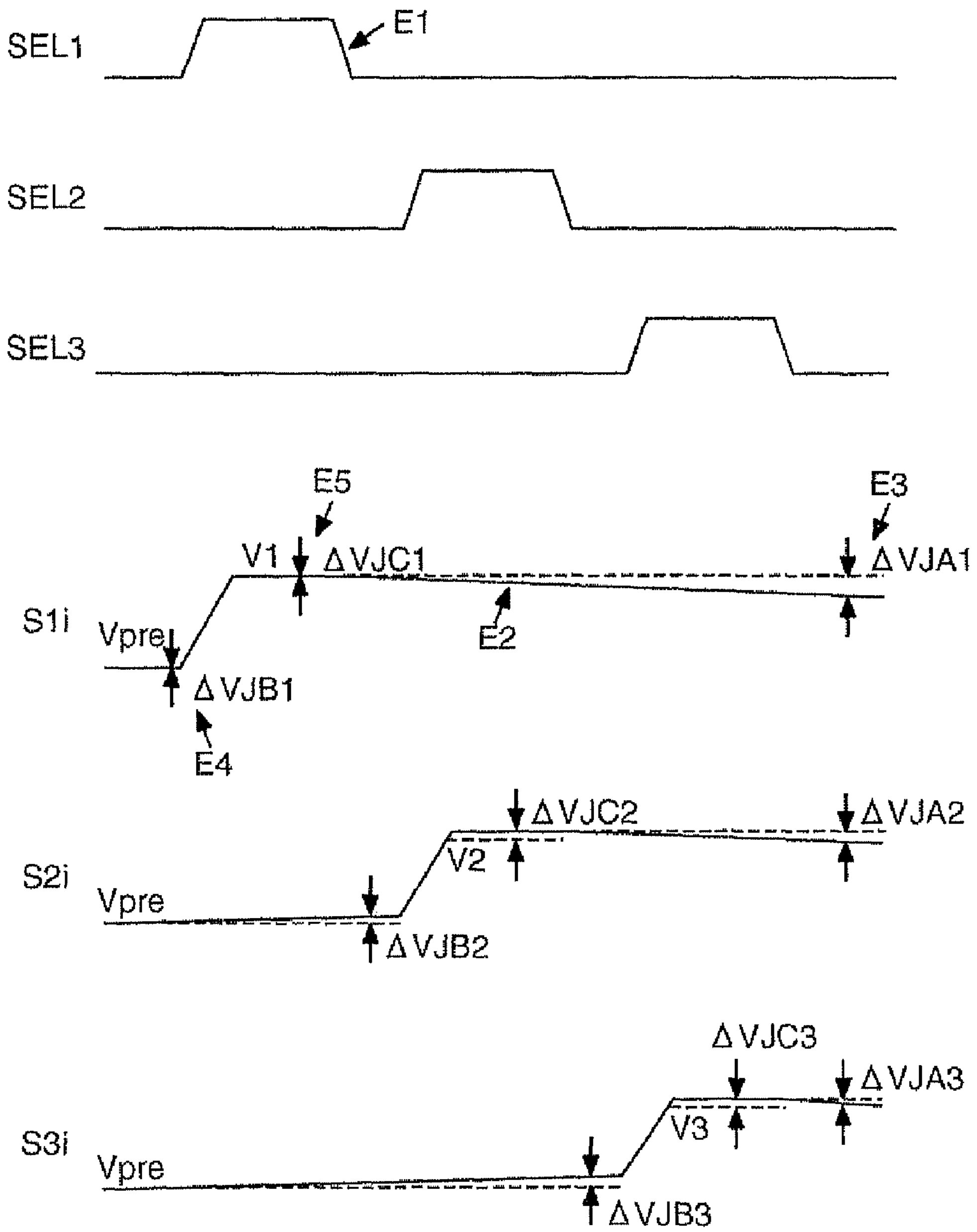
FIG. 6 is a chart for describing order offsets.

Referring to FIGS. 5 and 6, order offsets in the multiplex drive will be described. FIG. 5 schematically shows an exemplary arrangement composition of a liquid crystal panel (an electro optical panel). FIG. 5 shows an example in which multiplex driving is conducted for each three pixels, wherein the arrangement composition of the data lines S1*i*-S3*i* and the data signal supply line Si is shown as an example.

As shown in FIG. 5, data lines S1*i*-S3*i* are arranged on the liquid crystal panel. Plural pixels to be multiplex-driven are provided on the data lines S1*i*-S3*i*. For example, pixels P1*i*-1, P1*i*-2 are provided on the data line S1*i*, pixels P2*i*-1, P2*i*-2 are provided on the data line S2*i*, and pixels P3*i*-1, P3*i*-2 are provided on the data line S3*i*. In multiplex driving, for example, pixels P1*i*-1, P2*i*-1, P3*i*-1 are driven in a time-division manner in one horizontal scanning period.

Also, a data signal supply lines Si is arranged on the liquid crystal panel. Further, between the data signal supply line Si and the data lines S1*i*-S3*i*, transistors T1*i*-T3*i* (for example, N-type transistors) are provided, respectively, as the switch elements (demultiplexing switch elements) of the demultiplexer DMUXi. The multiplex control signals SEL1-SEL3 are inputted through signal lines NS1-NS3 to the gates of the transistors T1*i*-T3*i*, respectively.

When the transistors T1*i*-T3*i* turn off after the transistors T1*i*-T3*i* have been turned on and the data lines S1*i*-S3*i* have been driven, leak current I leak1-I leak3 flow between the data lines S1*i*-S3*i* and the data signal supply line Si through the transistors T1*i*-T3*i*. For example, the leak currents I leak1-I leak3 are generated when the transistors T1*i*-T3*i* are illuminated with backlight.

Then, as indicated by E1 in FIG. 6, when the multiplex control signal SEL1 becomes non-active and the transistor T1*i* turns off, the voltage on the data line S1*i* changes due to the leak current I leak1, as indicated by E2. Then, as indicated by E3, the data voltage on the data line S1*i* finally becomes to be V1+ΔVJA1, which includes a voltage change amount ΔVJA1. Similarly, the data voltages on the data lines S2*i*, S3*i* finally become V2+ΔVJA2, V3+ΔVJA3, respectively.

In this instance, the amount of voltage change, ΔVJA1, ΔVJA2 and ΔVJA3, is affected by the time duration in which each of the leak currents I leak1-I leak3 flows, in other words, the longer the leak current flows, the greater the amount of voltage changes. For this reason, the amount of voltage change, ΔVJA1-ΔVJA3, differ depending on the order of driving pixels (drive timing).

In this manner, in multiplex driving, there is a problem in that order offsets ΔVJA1-ΔVJA3 (errors, deviations, variations) that differ depending on the order of pixel driving occur in data voltages to be written to pixels on the data lines S1*i*-S3*i*.

Also, the leak currents I leak1-I leak3 are affected by the data voltage to be written to pixels and the voltage on the data signal supply lines Si, whereby their magnitude change. Therefore, there is also a problem in that the order offsets ΔVJA1-ΔVJA3 would become to be offsets having an inclination in its characteristic with respect to the grayscale of image data.

Therefore, in accordance with the present embodiment, in each horizontal scanning period, a pre-charge voltage Vpre may be applied to pixels, and the data voltage may be written to the pixels through multiplex driving. The pre-charge voltage Vpre is a voltage to be applied for initializing the voltage of the pixels, and/or for shortening the time of writing the data voltage.

During the period after application of the pre-charge voltage Vpre until the pixels are driven, the data lines S1*i*-S3*i* are set in a high impedance state. For this reason, the pre-charge voltage Vpre is retained by liquid crystal capacitance of the pixels and parasitic capacitance of the data lines S1*i*-S3*i*.

In this instance, the liquid crystal capacitance of the pixels change its capacitance value as the orientation of the liquid crystal changes in response to the pre-charge voltage Vpre. Therefore, as the data lines S1*i*-S3*i* are in a high impedance state, the voltage on the data lines S1*i*-S3*i* change according to changes in the liquid crystal capacitance of the pixels. For example, as indicated by E4 in FIG. 6, the data voltage on the data line S1*i* changes by a voltage change amount ΔVJB1 during the period until the pixels are driven, and becomes to be Vpre+ΔVJB1. Similarly, the data voltages on the data lines S2*i*, S3*i*, become to be Vpre+ΔVJB2, Vpre+ΔVJB3, respectively.

In this manner, if the voltage at the start of driving the pixels differs due to the voltage change amount ΔVJB1-ΔVJB3, the data voltage to be written to the pixels changes in its peak point. For example, as indicated by E5, the data voltage to be written to the pixels on the data line S1*i* changes by a voltage change amount ΔVJC1 due to the voltage change amount ΔVJB1, becoming to be V1+ΔVJC1. Similarly, the data voltages to be written to the pixels on the data lines S2*i*, S3*i* become to be V2+ΔVJC2, V3+ΔVJC3, respectively.

The voltage change amount ΔVJB1-ΔVJB3 is a voltage change amount that differs depending of the duration of the period after application of the pre-charge voltage Vpre until the pixels are driven, and therefore is a voltage change amount that differs depending on the order of driving the pixels. Therefore, the voltage change amount ΔVJC1-ΔVJC3 is also a voltage change amount that differs depending on the order of driving the pixels.

In this manner, in multiplex driving, there is also a problem in that order offsets ΔVJC1-ΔVJC3 that differ depending on the order of driving pixels are generated in data voltages to be written to the pixels on the data lines S1*i*-S3*i*.

Therefore, the order offsets ΔVJA1-ΔVJA3, ΔVJC1-ΔVJC3 cause errors in the luminance of pixels depending on the order of driving the pixels, which leads to a problem of occurrence of streaks (luminance irregularity, color irregularity) in displayed images.

2.2. Exemplary Composition

To solve the problems described above, an integrated circuit device of a first exemplary composition in accordance with the present embodiment includes first—n-th (n is a natural number of 2 or greater) data line driving circuits 200-1-200-*n* (a plurality of data line driving circuits), first—n-th order offset addition circuits 260-1-260-*n* (a plurality of order offset addition circuits), first—n-th output selection circuits 220-1-220-*n* (a plurality of output selection circuits), an order offset register 270, a selection circuit 280 and an order setting circuit 250.

Figure 7:
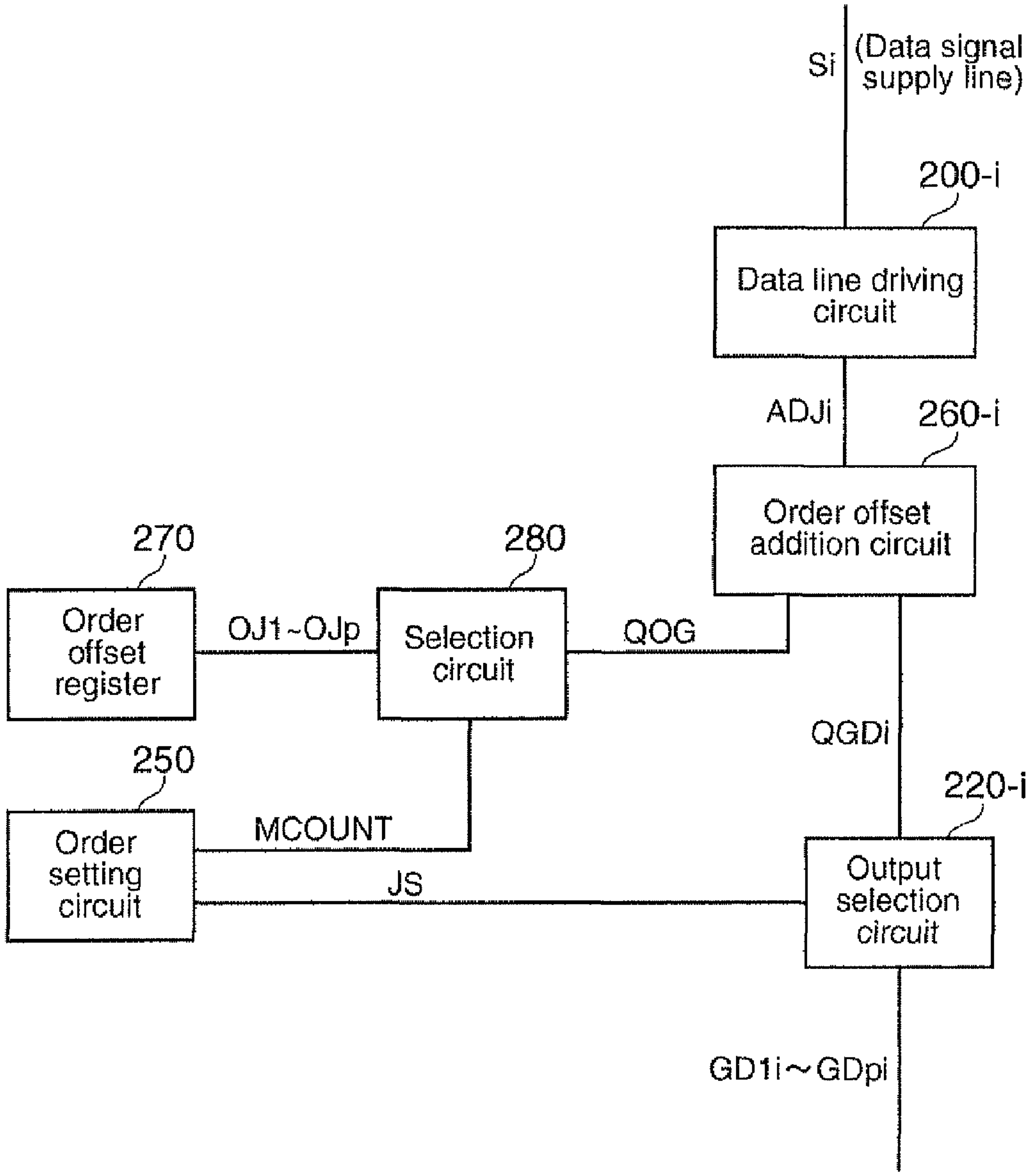
FIG. 7 is a diagram of a first exemplary composition in accordance with an embodiment of the invention.

FIG. 7 shows the i-th data line driving circuit 200-*i* (1 is a natural number less than n), the i-th order offset addition circuit 260-*i*, and the i-th output selection circuit 220-*i* among the data line driving circuits 200-1-200-*n*, the order offset addition circuits 260-1-260-*n*, and the output selection circuits 220-1-220-*n* of the first exemplary composition. Hereunder, description will be made with these illustrated components as an example. It is noted that similar description is applicable to the other data line driving circuits, order offset addition circuits, and output selection circuits.

The first exemplary composition pertains to a circuit in which the data line driving circuit performs multiplex driving in which data voltages (or data currents, or data signals in a broader sense) are written to a plurality of pixels in each one horizontal scanning period, and order offset correction values are added to image data, thereby correcting order offsets in data voltages.

Here, it is assumed that the data line driving circuit 200-*i* writes data voltages to the first—p-th pixels P1-*i*-Ppi (p is a natural number of 2 or greater), as a plurality of pixels, in one horizontal scanning period.

Then, the data line driving circuit 200-*i* drives in a time-division manner the first—p-th data lines S1-*i*-Spi corresponding to the pixels P1-*i*-Ppi in one horizontal scanning period, and writes data signals to the pixels P1-*i*-Ppi. The data line driving circuit 200-*i*, upon receiving offset added data ADGi from the position offset addition circuit 260-*i*, drives the data signal supply line Si (a data voltage supply line, or a data current supply line), thereby writing data voltages to the pixels P1-*i*-Ppi.

The order setting circuit 250 sets an order of driving the pixels P1-*i*-Ppi. Concretely, the order setting circuit 250 outputs an order instruction signal MCOUNT instructing as to which one of the first—p-th places in the driving order be applied, and outputs a pixel selection signal JS instructing as to which one of the pixels P1-*i*-Ppi at that driving order be selected. For example, the order setting circuit 250 may set the same driving order in each of the horizontal scanning periods, or may perform a rotation to set a different driving order in each of the horizontal scanning periods.

The output selection circuit 220-*i*, upon receiving the pixel selection signal JS and the image data GD1-*i*-GDpi, outputs selected image data QGDi. More concretely, the output selection circuit 220-*i*, upon receiving the pixel selection signal JS instructing to select the q-th pixel Pqi (q is a natural number less than p) in the r-th (r is a natural number less than p) place in the driving order, selects the image data GDqi, and outputs the image data GDqi as the selected image data QGDi.

The order offset register 270 stores order offset setting values OJ1-OJp. For example, as the order offset setting values OJ1-OJp, the order offset register 270 stores first—p-th order offset constant values OJL1-OJLp and first—p-th order offset coefficient values OJM1-OJMp, to be described below. In the order offset register 270, the order offset setting values OJ1-OJp are set by, for example, an unshown host controller (CPU).

Upon receiving the order instruction signal MCOUNT and the order offset setting values OJ1-OJp, the selection circuit 280 outputs a selected offset setting value QOJ. More concretely, the selection circuit 280, upon receiving the order instruction signal MCOUNT indicating the r-th place in the driving order, selects the order offset setting value OJr, and outputs the order offset setting value OJr as the selected offset setting value QOJ.

The order offset addition circuit 260-*i*, upon receiving the selected offset setting value QOJ and the selected image data QGDi, obtains an order offset correction value ΔOJi. Then, the selected image data QGDi and the order offset correction value ΔOJi are added, and the addition-processed image data is outputted as added image data ΔOJi. For example, let us consider an instance where the data line driving circuit 200-*i* drives the pixel Pqi in the r-th place in the order in one horizontal scanning period. In this instance, for example, an order offset constant value OJLr and an order offset coefficient value OJMr are inputted as the order offset setting value QOJ in the order offset addition circuit 260-*i*. Then, the order offset addition circuit 260-*i* obtains an order offset correction value ΔOJi=OJLr+OJMr×GDqi, and then outputs added image data ADGi=GDqi+ΔOJi.

Here, the process of adding the selected image data QGDi and the order offset correction value ΔOJi is not limited to simple addition of the selected image data QGDi and the order offset correction value ΔOJi, but may further include processing of addition with other data, or processing of multiplication with other data.

It is noted that the integrated circuit device in accordance with the embodiment of the invention is not limited to the composition of FIG. 7, but many modifications including omission of a portion of the components thereof (for example, the selection circuit 280 and the like), addition of other components thereto, and the like can be made.

2.3. Operation of Order Offset Correction

Referring to FIG. 8, an example of operations of the first exemplary composition will be described concretely. Referring to FIG. 8, description is made as to an example in which the data line driving circuit 200-*i* writes data voltages to pixels P1-*i*-P8-*i* (p=8) in one horizontal scanning period.

In this case, as the order of driving the pixels P1-*i*-P8-*i*, the first-eighth places in the driving order in one horizontal scanning period are set. For example, the second position (the r-th position) in the driving order indicated by F2 is set as the driving order for the pixel P5-*i* (pixel Pqi, q=5) indicated by F1 in FIG. 8.

In this instance, as indicated by F3, a pixel selection signal JS instructing to select the pixel P5-*i* is outputted. Based on the pixel selection signal JS, image data GD5-*i* (GDqi) is selected, as indicated by F4, and selected image data QGDi=GD5-*i* is outputted.

Also, as indicated by F5, an order instruction signal MCOUNT instructing the second place (the r-th position) in the driving order is outputted. Then, as indicated by F6, an order offset setting value OJ2 (OJr) is selected based on the order instruction signal MCOUNT, and a selected offset setting value QOJ=OJ2 is outputted.

Then, based on the selected offset setting value OJ2 and the selected image data GD5-*i*, added image data ADGi is outputted. Based on the added image data ADGi, the data line S5-*i* (Sqi) is driven, as indicated by F7.

As described above, in multiplex driving, there is a problem in that order offsets ΔVJ1-ΔVJq that differ depending on the order of driving the pixels P1-*i*-Ppi are generated in data voltages to be written to the pixels P1-*i*-Ppi (for example, ΔVJA1-ΔVJA3, ΔVJC1-ΔVJC3 in FIG. 6). This causes a problem in that streaks are generated due to these order offsets ΔVJ1-ΔVJq.

In this respect, in accordance with the present embodiment, the order offset register 270 stores the order offset setting values OJ1-OJp correlated to the first—the p-th places in the driving order, and the order setting circuit 250 sets an order of driving the pixels P1-*i*-Ppi. Then, when the data line driving circuit 200-*i* drives the pixel Pqi in the r-th place in the order according to the driving order, the order offset addition circuit 260-*i* obtains an order offset correction value ΔOJi corresponding to the r-th place in the driving order based on the order offset setting value OJr, and processes addition of the order offset correction value ΔOJi to the image data GDqi, and outputs the addition-processed image data ADGi to the data line driving circuit 200-*i*.

In accordance with the present embodiment, the order offset register 270 stores the order offset setting values OJ1-OJp correlated to the first—the p-th places in the driving order, and the order setting circuit 250 sets an order of driving the pixels P1*i*-Ppi. By this, the order of driving the pixels P1*i*-Ppi is set, and the order offset correction value ΔOJi corresponding to the r-th place in the driving order can be obtained based on the order offset setting value OJr.

Furthermore, in accordance with the present embodiment, when the data line driving circuit 200-*i* drives the pixel Pqi in the r-th place in the driving order, the order offset addition circuit 260-*i* processes addition of the order offset correction value ΔOJi corresponding to the r-th place in the driving order to the image data GDqi. By this, order offsets ΔVJ1-ΔVJq in data voltages to be written to the pixels P1*i*-Ppi can be corrected. Therefore, generation of streaks in the display images due to the order offsets ΔVJ1-ΔVJq can be prevented.

As an art related to the invention, the aforementioned Patent Document 1 describes a rotation method in multiplex driving. More specifically, Patent Document 1 describes a method for averaging display irregularities that may be caused by data voltage offsets, by conducting a rotation in which the order of driving pixels is set different in each of the horizontal scanning periods.

However, according to this method, the cycle of rotation (the number of horizontal scanning periods for returning to the same driving order) becomes longer as the number of pixels to be multiplex-driven increases, and the cycle of averaging becomes longer. This entails a problem in that the pattern of rotation appears as display irregularities such as slanted streaks or the like.

In this respect, in accordance with the present embodiment, by processing addition of the order offset constant value ΔOJi to image data, order offsets in data voltages can be corrected. By this, irrespective of the presence or absence of the rotation, display irregularities due to order offsets can be prevented. In this manner, even when the number of pixels to be multiplex-driven increases, display irregularities due to order offsets can be prevented.

As described with reference to FIG. 6, etc., the multiplex driving may also entail a problem in that the order offsets ΔVJ1-ΔVJq may be offsets having an inclination in their characteristic with respect to the grayscale of image data.

Figure 9A:
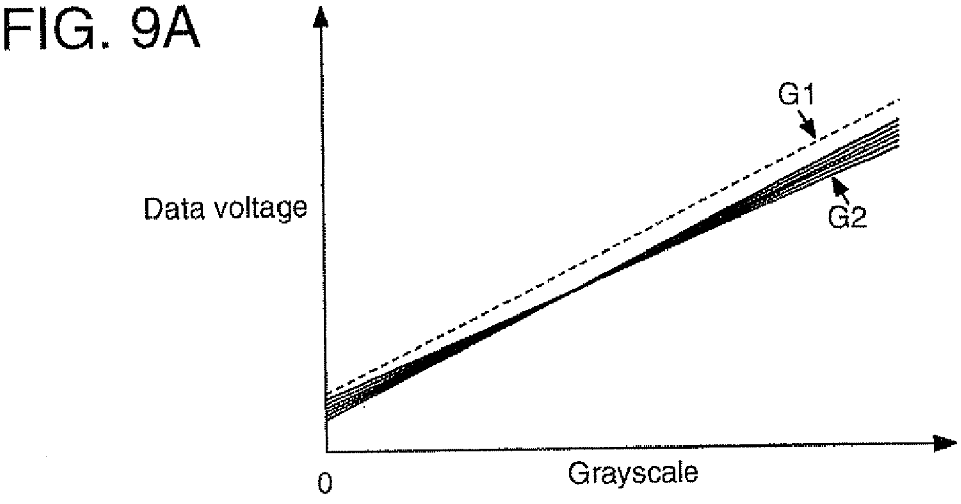
FIGS. 9A-9C are graphs for describing order offset correction.
Figure 9B:
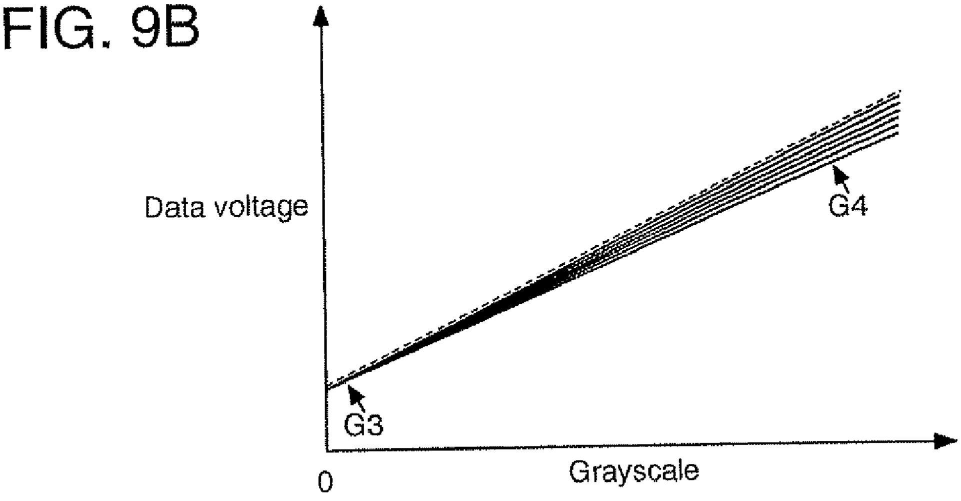
Figure 9C:
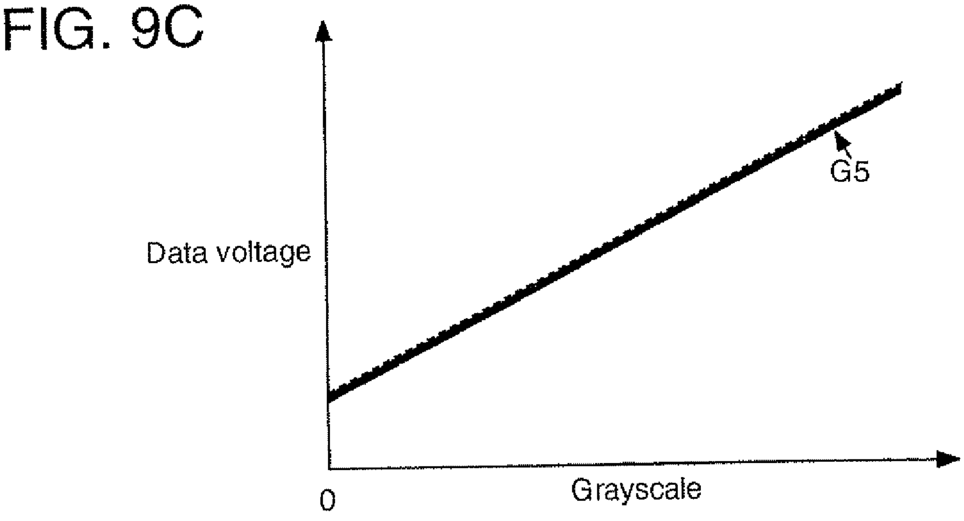

Referring to FIGS. 9A-9C, the aforementioned problem is described in detail. Referring to FIGS. 9A-9C, description will be made as to an example in which the data line driving circuit 200-*i* drives pixels P1*i*-P6*i* (p=6) in one horizontal scanning period.

As shown in FIG. 9A, in contrast to an ideal data voltage characteristic indicated by G1, the voltage characteristic of data voltages to be written to the pixels P1*i*-P6*i* indicated by G2 contains order offsets.

In this respect, in accordance with the present embodiment, the order offset register 270 stores order offset constant values OJL1-OJLp, as the order offset setting values OJ1-OJp, and the order offset addition circuit 260-*i* may process addition of the order offset constant value OJLr, as the order offset correction value ΔOJi, to the image data GDqi.

In this manner, by processing addition of the order offset constant value OJLr to the image data GDqi, the order offset being a constant value in its characteristic with respect to the grayscale of image data can be corrected. For example, as indicated by G3 in FIG. 9B, the order offset at 0 grayscale may be corrected, whereby the data voltage characteristics of the pixels P1*i*-P6*i* can be approximated to the ideal data voltage characteristic.

However, as indicated by G4, the order offsets may have an inclination in their characteristic with respect to the grayscale of the image data. In this instance, the data voltage characteristics for the pixels P1*i*-P6*i* become to be voltage characteristics containing the order offsets by the amount of these inclinations.

In this respect, in accordance with the present embodiment, the order offset register 270 may store order offset coefficient values OJM1-OJMp, as the order offset setting values OJ1-OJp, and the order offset addition circuit 260-*i* may process addition of a value obtained as the order offset correction value ΔOJi by multiplying an order offset coefficient value OJMr and the image data GDqi to the image data GDqi.

In this manner, by processing addition of a value obtained by multiplying the order offset coefficient value OJMr and the image data GDqi to the image data GDqi, order offsets having an inclination in characteristic with respect to the grayscale of the image data can be corrected. In this manner, as indicated by G5 in FIG. 9C, the data voltage characteristics for the pixels P1*i*-P6*i* can be approximated to the ideal data voltage characteristic.

It is noted here that the present embodiment may include an output selection circuit 220-*i*. When the data line driving circuit 200-*i* drives the q-th pixel Pqi in the r-th place in the order, the output selection circuit 220-*i*, upon receiving a pixel selection signal JS instructing to select the pixel Pqi, outputs image data GDqi, and the order offset addition circuit 260-*i* may process addition of an order offset correction value ΔOJi based on the order offset setting value OJr to the image data GDqi.

In this manner, when the pixel Pqi is driven in the r-th place in the order, the order offset correction value ΔOJi corresponding to the r-th place in the driving order can be obtained. Then, by processing addition of the order offset correction value ΔOJi to the image data GDqi, the order offset ΔVJr corresponding to the r-th place in the driving order can be corrected.

As described above with reference to FIG. 5, etc., the present embodiment may include an electro optical panel. The electro optical panel may include a plurality of pixels to be multiplex-driven, a plurality of data lines corresponding to the plurality of pixels, and a plurality of switch elements for demultiplexing data voltages to be supplied to the data signal supply lines for the plurality of data lines.

In accordance with the present embodiment, order offsets in data voltages can be corrected even when such a liquid crystal panel is included. Concretely, order offsets in data voltages that are caused by leak currents of the switch elements and the like can be corrected.

3. Position Offset Correction 3.1. Position Offset

Figure 10:
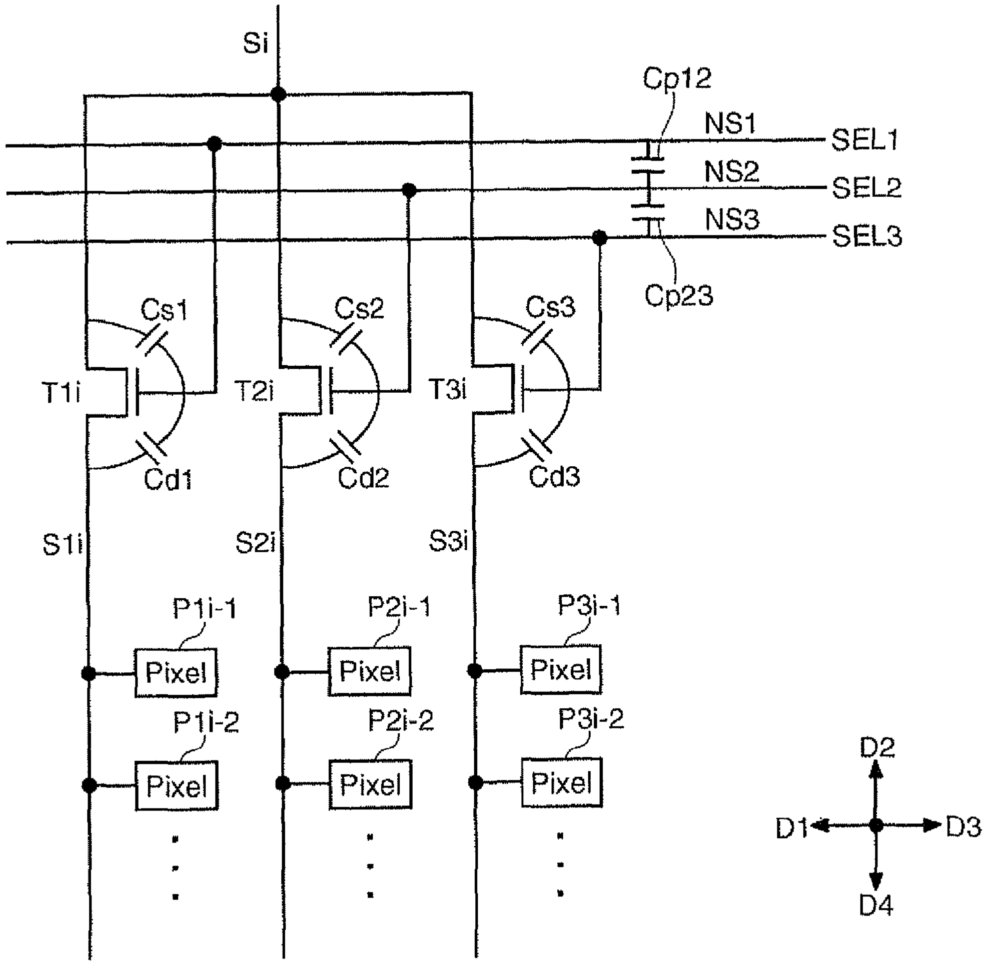
FIG. 10 is a diagram for describing position offsets.
Figure 11:
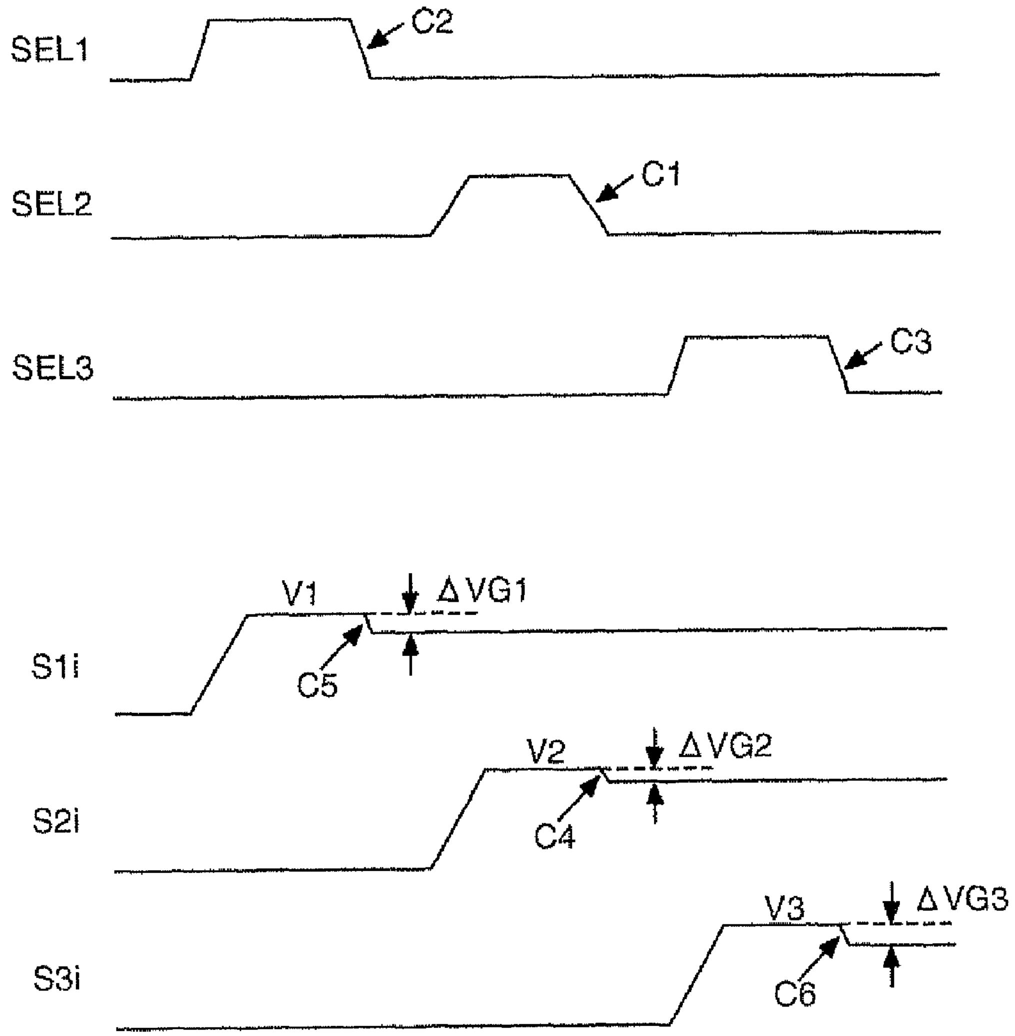
FIG. 11 is a chart for describing position offsets.

Referring to FIGS. 10 and 11, position offsets in the multiplex driving will be described. FIG. 10 schematically shows an exemplary arrangement composition of a liquid crystal panel. FIG. 10 shows an example in which multiplex driving is performed for each three pixels, and illustrates an arrangement composition including the data lines S1*i*-S3*i* and the data signal supply line Si as an example. It is noted that capacitances Cs1-Cs3, Cd1-Cd3, Cp12 and Cp23 shown in FIG. 10 are parasitic capacitances schematically shown, and are not components that actually exist on the liquid crystal panel.

Here, as indicated in FIG. 10, a direction perpendicular to the first direction D1 is defined as a second direction D2, an opposite direction of the direction D1 is defined as a third direction D3, and an opposite direction of the direction D2 is defined as a fourth direction D4.

Accordingly, the data lines S1*i*-S3*i* are wired along the direction D2 (or D4), and sequentially arranged in a direction along the direction D1 (D3). Pixels P1*i*-1 P3*i*-1, P1*i*-2-P3*i*-2 are provided on the data lines S3*i*.

Between the data lines S1*i*-S3*i* and the data signal supply line Si, transistors T1*i*-T3*i* are provided, respectively. Multiplex control signals SEL1-SEL3 are inputted through signal lines NS1-NS3 to the gates of the transistors T1*i*-T3*i*, respectively. The signal lines NS1-NS3 are wired along the direction D1 (or D3), and sequentially arranged in a direction along the direction D2 (D4).

In this instance, gate-source capacitances and gate-drain capacitances are generated as parasitic capacitances among the wirings connecting to the electrodes of the transistors T1*i*-T3*i*. For example, as shown in FIG. 10, gate-source capacitances Cs1-Cs3 are generated between the signal lines NS1-NS3 and the data signal supply lines Si, and gate-drain capacitances Cd1-Cd3 are generated are generated between the signal lines NS1-NS3 and the data lines S1*i*-S3*i*.

Also, as the signal lines NS1-NS3 run in parallel with each other on the liquid crystal substrate, inter-line parasitic capacitances are generated between the signal lines NS1-NS3. For example, as shown in FIG. 10, a parasitic capacitance Cp12 is generated between the signal line NS1 and the signal line NS2, and a parasitic capacitance Cp23 is generated between the signal line NS2 and the signal line NS3.

Due to generation of the parasitic capacitances Cp12 and Cp23, capacitances Cp12 and Cp23 are seen as loads from the signal line NS2 located in the middle thereof, and a capacitance Cp12 that is smaller than the load of the signal line NS2 can be seen from the signal line NS1 that is located at one end. Also, a capacitance Cp23 that is smaller than the load of the signal line NS2 can be seen from the signal line NS3 located at the other end.

Then, as indicated by C1 in FIG. 11, a falling edge (an edge changing from active to non-active) of the multiplex control signal SEL2 changes more gently than falling edges of the multiplex control signals SEL1 and SEL3 with smaller loads indicated by C2 and C3.

When the multiplex control signals SEL1-SEL3 fall (when becoming non-active), the voltages on the data lines S1*i*-S3*i* change by push-down (i.e., voltage coupling) through the parasitic capacitances Cs1-Cs3, Cd1-Cd3 of the transistors T1*i*-T3*i*. In this instance, the amount of voltage change by push-down becomes different depending on the gentleness or steepness of the falling edge. Therefore, a voltage change amount ΔVG2 on the data line S2*i* indicated by C4 in FIG. 11 and voltage change amounts ΔVG1, ΔVG3 on the data lines S1*i*, S3*i* indicated by C5, C6 become mutually different in magnitude.

Then, a data voltage including an offset ΔVG2 (error, deviation, variation), V2-ΔVG2, is written to the pixels on the data line S2*i*. Also, data voltages including offsets ΔVG1, ΔVG3 that are different in magnitude from ΔVG2, namely, V1-ΔVG1, V3-ΔVG3, are written, respectively, to the pixels on the data lines S1*i*, S3*i*. As described above, the offsets ΔVG1-ΔVG3 are different in magnitude depending on the positions of the signal lines NS1-NS3. As a result, data voltages to be written to the pixels on the data lines S1*i*-S3*i* include position offsets ΔVG1-ΔVG3 (errors, deviations, variations) that differ in magnitude depending on the positions of the pixels.

In this manner, the multiplex driving entails a problem in that position offsets that are different according to the positions of the pixels are generated in data voltages to be written to a plurality of pixels in each one horizontal scanning period. Due to these position offsets, errors in the luminance value of pixels are generated in each data line, which causes a problem in which streaks (display irregularities, luminance irregularities, color irregularities) are generated in the displayed image.

3.2. Exemplary Composition

To solve the problems described above, an integrated circuit device of a second exemplary composition in accordance with the present embodiment includes first—n-th data line driving circuits **200-1-200-*n* (a plurality of data line driving circuits), first—n-th position offset addition circuits 210-1-210-*n* (a plurality of position offset addition circuits), first—n-th output selection circuits 220-1-220-*n* (a plurality of output selection circuits), a position offset register 230, a selection circuit 240 and an order setting circuit 250**.

Figure 12:
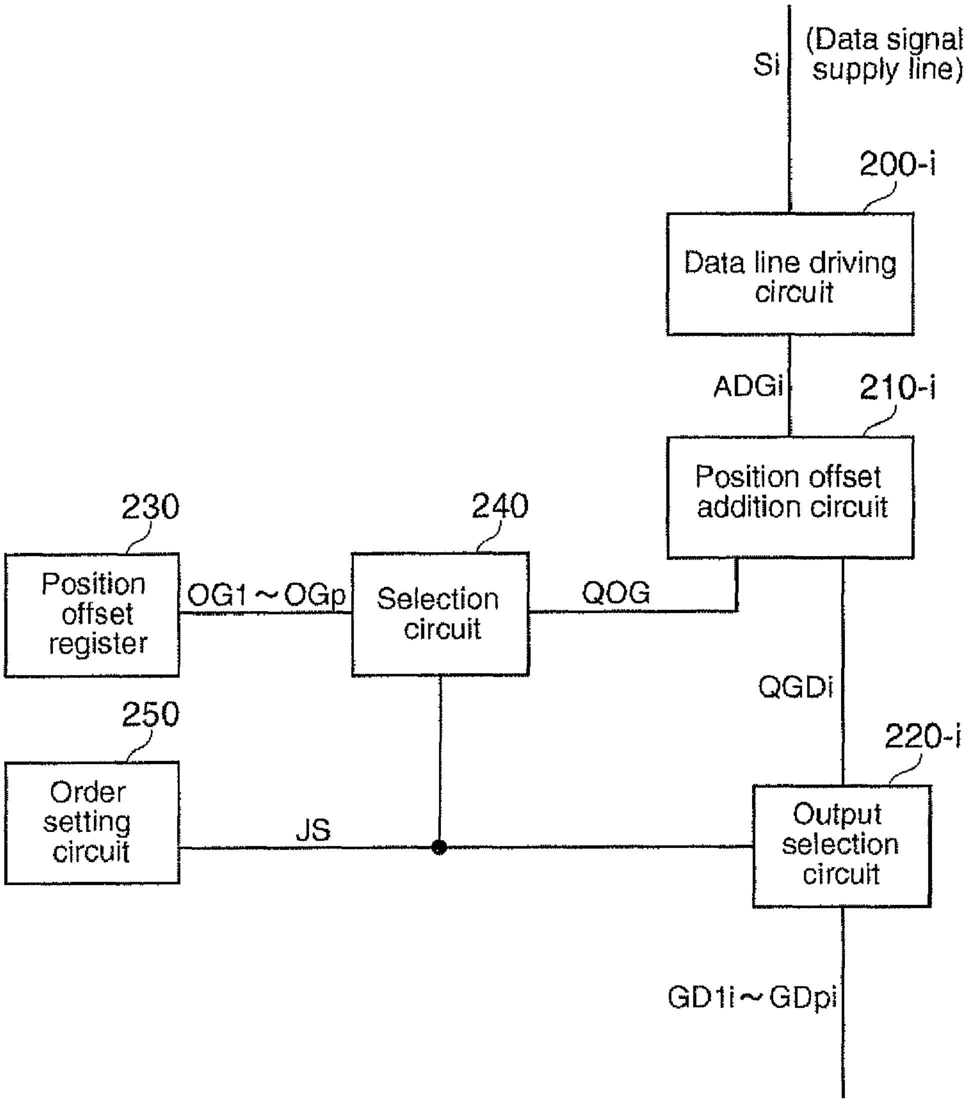
FIG. 12 is a diagram of a second exemplary composition in accordance with the embodiment of the invention.

In FIG. 12, the i-th data line driving circuit **200-*i*, the i-th position offset addition circuit 210-*i*, and the i-th output selection circuit 220-*i*** of the second exemplary structure are shown, like the exemplary structure shown in FIG. 7. Hereinbelow, description will be made with these illustrated components as an example. Also, components that are the same as those described with reference to FIG. 7, etc., such as, the data line driving circuit will be appended with the same reference number, and their description may be omitted if appropriate.

The second exemplary composition pertains to a circuit in which the data line driving circuit performs multiplex driving in which data voltages (or data currents, or data signals in a broader sense) are written to pixels P1*i*-Ppi (a plurality of pixels) in each one horizontal scanning period, and position offset correction values are added to image data corresponding to at least the pixels P1*i*-Ppi, thereby correcting position offsets in data voltages.

Hereunder, description will be made as to an example where position offset correction values are added to image data GD1*i*-GDpi, as the image data corresponding to at least the pixels P1*i*, Ppi. However, in accordance with the present invention, position offset correction values may be added to the image data GD1*i* and GDp, as the image data corresponding to at least the pixels P1*i* and Ppi.

The order setting circuit 250 outputs a pixel selection signal JS instructing as to which one of the pixels among the pixels P1*i*-Ppi should be selected.

The output selection circuit **220-*i***, upon receiving the pixel selection signal JS instructing to select the pixel Pqi, selects image data GD1*i*, and outputs the image data GDqi as selected image data QGDi.

The position offset register 230 stores position offset setting values OG1-OGp. For example, as the position offset setting values OG1-OGp, the position offset register 230 stores first—p-th position offset constant values OGL1-OGLp and first—p-th position offset coefficient values OGM1-OGMp, to be described below. In the position offset register 230, the position offset setting values OG1-OGp are set by, for example, an unshown host controller (CPU).

Upon receiving the pixel selection signal JS and the position offset setting values OG1-OGp, the selection circuit 240 outputs a selected offset setting value QOG. More concretely, the selection circuit 240, upon receiving the pixel selection signal JS instructing to select the pixel Pqi, selects the position offset setting value OGq, and outputs the position offset setting value OGq as the selected offset setting value QOG.

The position offset addition circuit **210-*i*, upon receiving the selected offset setting value QOG and the selected image data QGDi, obtains a position offset correction value ΔOGi. Then, the selected image data QGDi and the position offset correction value ΔOGi are added, and the image data after the addition processing is outputted as added image data ADGi. For example, let us consider an instance where the data line driving circuit 200**-*i* drives the pixel Pqi. In this instance, the position offset addition circuit 210-*i*, upon receiving, for example, a position offset constant value OGLq and a position offset coefficient value OGMq, obtains a position offset correction value ΔOGi=OGLq+OGMq×GDqi. Then, the position offset addition circuit 210-*i* outputs added image data ADGi=GDqi+ΔOGi.

Here, the process of adding the selected image data QGDi and the position offset correction value ΔOGi is not limited to simple addition of the selected image data QGDi and the position offset correction value ΔOGi, but may further include processing of addition with other data, or processing of multiplication with other data.

It is noted that the integrated circuit device in accordance with the embodiment of the invention is not limited to the composition of FIG. 12, but many modifications including omission of a portion of the components thereof (for example, the selection circuit 240 and the like), addition of other components thereto, and the like can be made.

3.3. Operation of Position Offset Correction

Referring to FIG. 13, an example of operations of the second exemplary composition will be described more concretely. Referring to FIG. 13, description is made as to an example in which the data line driving circuit 200-*i* writes data voltages to pixels P1*i*-P8*i* (p=8) in one horizontal scanning period.

In this case, as the order of driving the pixels P1*i*-P8*i*, the driving order of the first-eighth places (the first-eighth driving period) in one horizontal scanning period is set. For example, the second place in the driving order indicated by D2 is set as the driving order for the pixel P5*i* (the pixel Pqi, q=5) indicated by D1 in FIG. 13.

In this instance, as indicated by D3, a pixel selection signal JS instructing to select the pixel P5*i* is outputted. Based on the pixel selection signal JS, image data GD5*i* (GDqi) is selected, as indicated by D4, and selected image data QGDi=GD5*i* is outputted. As indicated by D5, a position offset setting value OG5 (OGq) is selected, and a selected offset setting value QOG=OG5 is outputted.

Then, based on the selected offset setting value OG5 and the selected image data GD5*i*, added image data ADGi is outputted. Based on the added image data ADGi, the data line S5*i* (Sqi) is driven, as indicated by D6.

As described above, in multiplex driving, there is a problem in that position offsets ΔVG1-ΔVGq that are different depending on the positions of the pixels P1*i*-Ppi are generated in data voltages to be written to the pixels P1*i*-Ppi (for example, ΔVG1-ΔVG3, q=3 in FIG. 11). This causes a problem in that streaks are generated due to these position offsets ΔVG1-ΔVGq.

In this respect, in accordance with the present embodiment, the position offset register 230 at least stores position offset setting values OG1, OGp corresponding to the pixels P1*i*, Ppi, and the position offset addition circuit 210-*i* at least obtains a position offset correction value ΔOGi corresponding to the pixel P1*i*, Ppi based on the position offset setting values, and at least processes addition of the position offset correction value ΔOGi to the image data GD1*i*, GDpi, and the data line driving circuit 200-*i*, upon receiving the addition-processed image data ADGi, writes the data voltages to the pixels P1*i*-Ppi.

In accordance with the present embodiment, by at least storing the position offset setting values OG1, OGp corresponding to the pixels P1*i*, Ppi, the position offset correction value ΔOGi corresponding to the pixel P1*i*, Ppi can be obtained based on the position offset setting values. Then, by at least processing addition of the position offset correction value ΔOGi to the image data GD1*i*, GDpi, the position offsets ΔVG1-ΔVGq in data voltages to be written to the pixels P1*i*-Ppi can be corrected. This makes it possible to prevent generation of streaks on displayed images, and to improve the image quality.

Here, as described with reference to FIG. 11, etc., among the pixels P1*i*-Ppi, position offsets having different magnitudes are generated at the pixels P1*i* and Ppi on the both ends and the pixels P2*i*-Pp-1*i* in the middle (for example, ΔVG1 and ΔVG3, and ΔVG2 in FIG. 11).

In this respect, in accordance with the present embodiment, the position offset register 230 may store only position offset setting values OG1 and OGp, as the position offset setting values at least to be stored. Then, the position offset addition circuit 210-*i* may obtain ΔOGi based on the position offset setting values OG1 and OGp, and may process addition of the position offset correction value ΔOGi to the image data GD1*i* and GDpi.

In this manner, the position offset correction value ΔOGi corresponding to the pixels P1*i* and Ppi on the both ends can be obtained. Then, it is possible to process addition of the position offset correction value ΔOGi to the image data GD1*i* and GDpi corresponding to the pixels P11 and Ppi on the both ends. By this, the offset difference between the pixels P1*i* and Ppi on the both ends and the pixels P2*i*-Pp-1*i* in the middle can be eliminated, whereby the position offsets ΔVG1-ΔVGq can be corrected.

Also, in accordance with the present embodiment, the position offset register 230 may further store position offset setting values OG2-OGp-1, as the position offset setting values at least to be stored. Then, the position offset addition circuit 210-*i* may obtain a position offset correction value ΔOGi based on the position offset setting values OG2-OGp-1, and may process addition of the position offset correction value ΔOGi to the image data GD2*i*-GDp-1*i*.

By this, the position offset correction value ΔOGi corresponding to the pixels P1*i*-Ppi can be obtained. Then, by processing addition of the position offset correction value ΔOGi to the image data GD1*i*-GDpi, the position offsets ΔVG1-ΔVGq can be corrected. In this manner, appropriate corrections can be made with respect to position offsets ΔVG1-ΔVGq in various states.

Here, in accordance with the present embodiment, the position offset register 230 may store at least position offset constant values OGL1, OGLp, as the position offset setting values at least to be stored. Then, the position offset addition circuit 210-*i* may at least process addition of the position offset constant values OGM1, OGMp, as the position offset correction value ΔOGi, to the image data GD1, GDp.

Also, in accordance with the present embodiment, the position offset register 230 may at least store position offset coefficient values OGM1, OGMp, as the position offset setting values at least to be stored. Then, the position offset addition circuit 210-*i* may at least process addition of values, as the position offset correction value ΔOGi, obtained by multiplying the position offset coefficient values OGM1, OGMp and the image data GD1, GDp, respectively, to the image data GD1, GDp.

In this manner, the position offset correction value ΔOGi can be obtained based on the position offset setting values, and the position offsets can be corrected with the position offset correction value ΔOGi.

Also, in accordance with the present embodiment, it is possible at least to obtain values calculated by multiplying the position offset coefficient values OGM1, OGMp and the image data GD1, GDp, respectively, as the position offset correction value ΔOGi. By this, even when the characteristic of position offsets with respect to the grayscale of image data has an inclination, the inclination in the characteristic of the position offsets can be corrected.

Here, the present embodiment may include an order setting circuit 250 that sets an order of driving pixels P1*i*-Ppi, and an output selection circuit 220-*i*. Then, when the data line driving circuit 200-*i* drives the pixel Pqi, the output selection circuit 220-*i* may, upon receiving a pixel selection signal JS instructing to select the pixel Pqi, output the image data GDqi, and the position offset addition circuit 210-*i* may process addition of a position offset correction value ΔOGi based on the position offset setting value OGq to the image data GDqi.

In this manner, when the pixel Pqi is to be driven, the position offset correction value ΔOGi corresponding to the pixel Pqi can be obtained. By processing addition of the position offset correction value ΔOGi to the image data GDqi corresponding to the pixel Pqi, the position offset ΔVGq in the data voltage for the pixel Pqi can be corrected.

As described with reference to FIG. 10, etc., the present embodiment may include a liquid crystal panel (an electro optical panel). The liquid crystal panel may be provided with pixels P1*i*-1-P3*i*-1, P1*i*-2-P3*i*-2 to be multiplex-driven, data lines S1*i*-S3*i* corresponding to the pixels P1*i*-1-P3*i*-1, P1*i*-2-P3*i*-2, switch elements T1*i*-T3*i* for demultiplexing data voltage supplied in the data signal supply line Si for the data lines S1*i*-S3*i*, and signal lines NS1-NS3 arranged along the direction D1 for controlling on and off of the switch elements T1*i*-T3*i*.

In accordance with the present embodiment, even when such a liquid crystal panel is included, position offsets in data voltages can be corrected. More concretely, it is possible to correct position offsets in data voltages which are caused by parasitic capacitances of the switch elements T1*i*-T3*i*, and parasitic capacitances of the signal lines NS1-NS3.

3.4. Combination with Position Offset Correction

An integrated circuit device of a third exemplary composition in accordance with the present embodiment includes first—n-th data line driving circuits 200-1-200-*n*, first—n-th position offset addition circuits 210-1-210-*n*, a position offset register 230, a selection circuit 240, first—n-th order offset addition circuits 260-1-260-*n*, an order offset resister 270, a selection circuit 280, first—n-th output selection circuits 220-1-220-*n*, and an order setting circuit 250.

Figure 14:
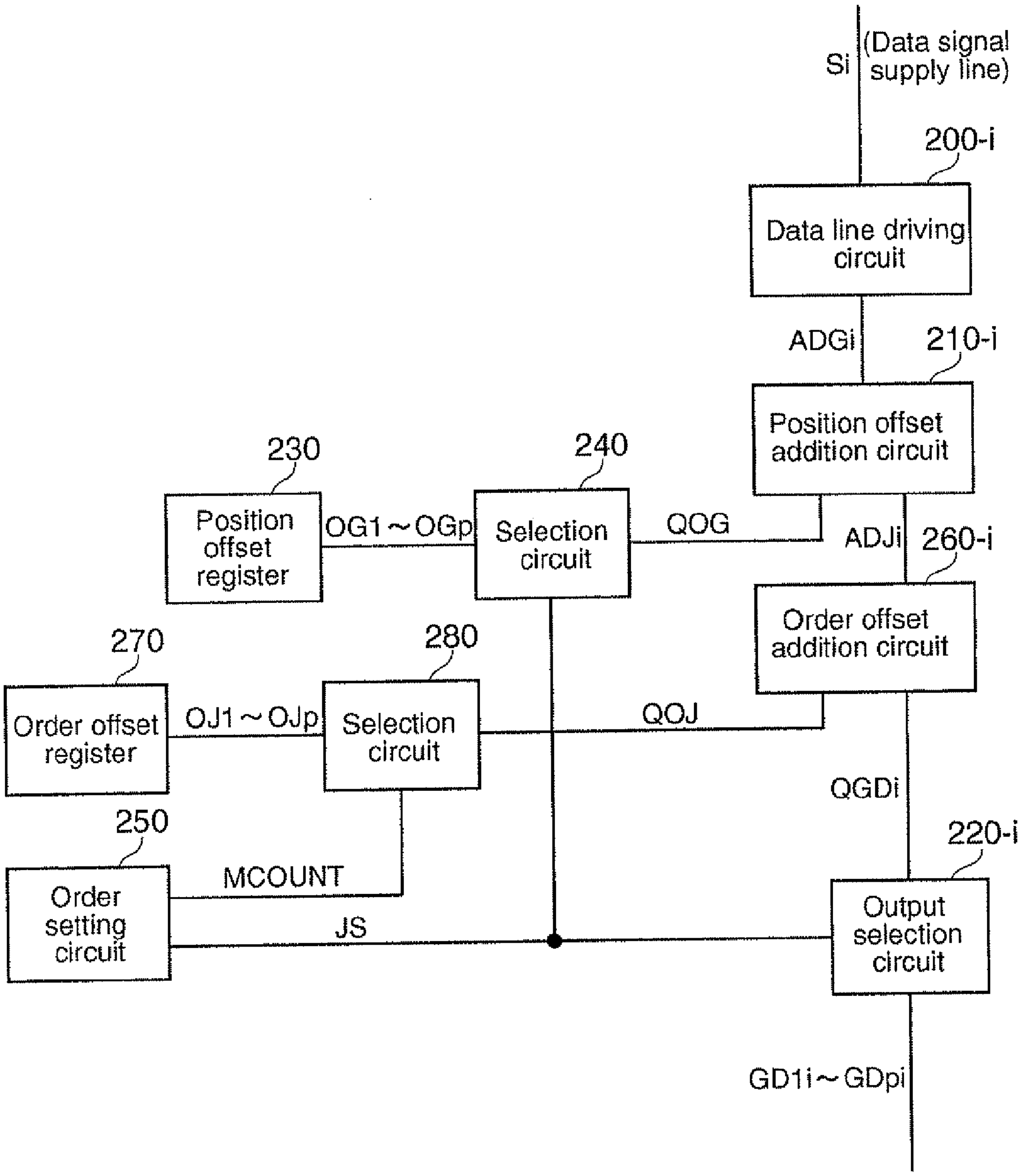
FIG. 14 is a diagram of a third exemplary composition in accordance with the embodiment of the invention.

FIG. 14 shows the i-th data line driving circuit 200-*i*, the i-th position offset addition circuit 210-*i*, the i-th order offset addition circuit 260-*i*, and the i-th output selection circuit 220-*i* of the third exemplary composition. It is noted that, hereunder, components that are the same as those described with reference to FIG. 7, FIG. 12, etc. are appended with the same reference numbers, and their description may be omitted if appropriate.

According to the third exemplary composition, by processing addition of an order offset correction value ΔOJi and a position offset correction value ΔOGi to image data GD1*i*-GDpi, order offsets and position offsets in data voltages are corrected.

Concretely, the output selection circuit 220-*i*, upon receiving a pixel selection signal JS instructing to select the pixel Pqi from the order setting circuit 250, outputs selected image data QGDi=GDqi.

The selection circuit 280, upon receiving order offset setting values OJ1-OJp from the order offset register 270 and an order instruction signal MCOUNT indicating the r-th place in the driving order from the order setting circuit 250, outputs a selected offset setting value QOJ=OJr. Then, the order offset addition circuit 260-*i*, upon receiving the selected offset setting value QOJ=OJr and the selected image data QGDi=GDqi, outputs added image data ADJi=GDqi+ΔOJi.

Then, the selection circuit 240, upon receiving position offset setting values OG1-OGp from the position offset register 230 and a pixel selection signal JS instructing to select pixel Pqi from the order setting circuit 250, outputs a selected offset setting value QOG=OGr. Then the position offset addition circuit 210-*i*, upon receiving the selected offset setting value QOG=OGq and the selected image data ADJi=GDqi+ΔOJi, outputs added image data ADGi=GDqi+ΔOJi+ΔOGi.

The data line driving circuit 200-*i*, upon receiving the added image data ADGi=GDqi+ΔOJi+ΔOGi, outputs a corresponding data voltage to the data signal supply lines Si, thereby driving the pixels P1*i*-Ppi.

In this manner, order offsets and position offsets generated in the data voltages to be written to the pixels P1*i*-Ppi can be corrected.

Figure 15:
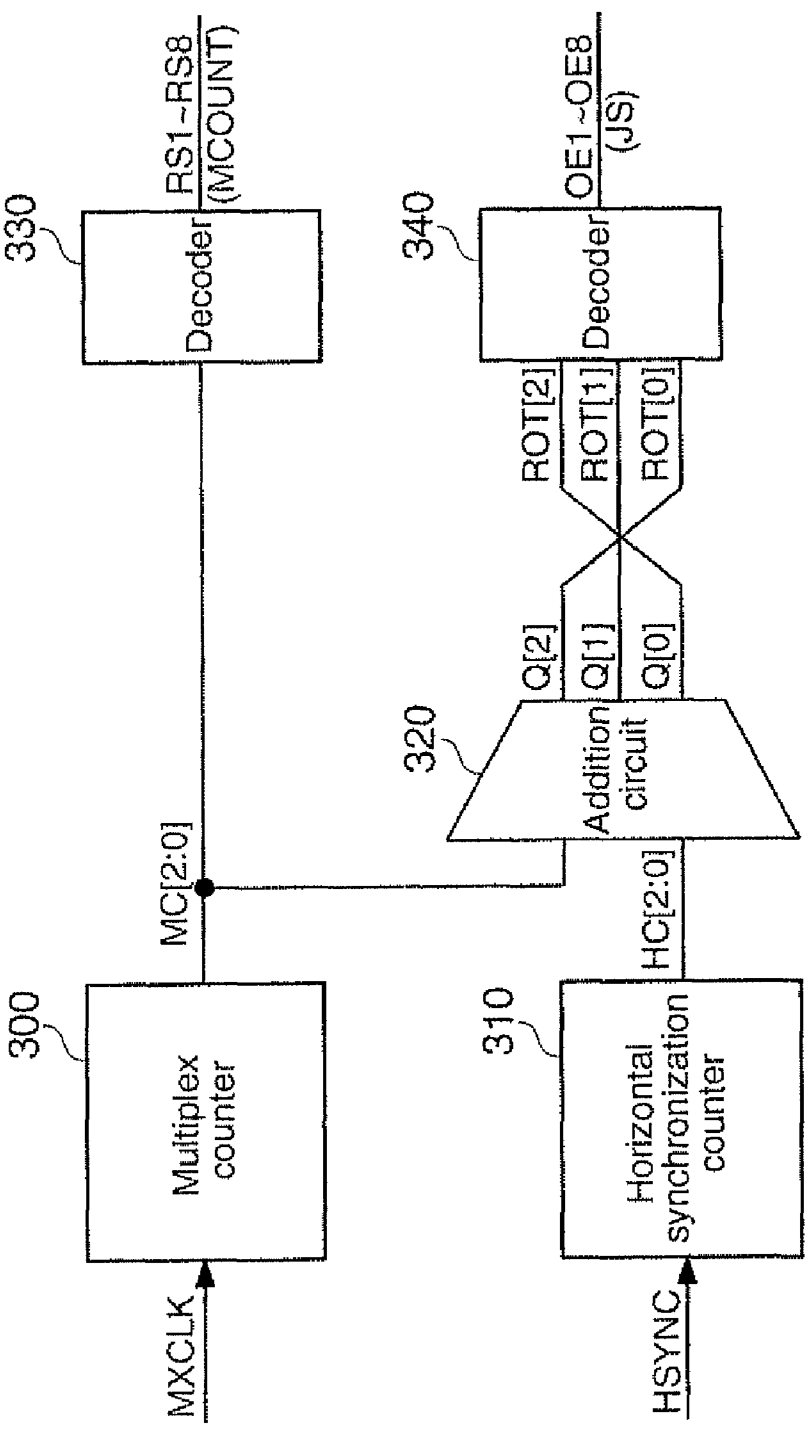
FIG. 15 is a diagram of an exemplary composition of an order setting circuit.

4. Order Setting Circuit, Output Selection Circuit, Offset Addition Circuit 4.1. Order Setting Circuit FIG. 15 shows an exemplary composition of the order setting circuit 250. This exemplary composition includes a multiplex counter 300, a horizontal synchronization counter 310, an addition circuit 320, and decoders 330, 340. It is noted that, for simplification of the description, the case in which the driving order for eight pixels is set will be described as an example.

The multiplex counter 300, upon receiving a multiplex clock MXCLK from, for example, a multiplex driving control section 36, counts the number of clocks of the clock MXCLK, and outputs a count value MC [2:0].

The decoder 330, upon receiving the count value MC [2:0], decodes the count value MC [2:0], and outputs order instruction signals RS1-RS8 (MCOUNT).

Upon receiving a horizontal synchronization signal HSYNC, the horizontal synchronization counter 310 counts the number of the horizontal synchronization signals HSYNC, and outputs a count value HC [2:0].

The addition circuit 320, upon receiving the count value MC [2:0] and the count value HC [2:0], processes addition of the count value MC [2:0] and the count value HC [2:0], and output an added count value Q [2:0].

The decoder 340, upon receiving rotation data ROT [2:0], decodes the rotation data ROT [2:0], and outputs pixel selection signals OE1-OE8. In the decoder 340, ROT [2:0]=Q [0:2], in which the upper bit and the lower bit of the added count value Q [2:0] are switched, is inputted as rotation data ROT [2:0].

In the case of an added count value in other bit numbers, rotation data, in which a lower bit sequence of the added count value is inverted to an upper bit sequence and an upper bit sequence of the added count value is inverted to a lower bit sequence, is inputted. For example, in the case of a 4-bit added count value Q [3:0], rotation data ROT [3:0], in which an upper bit sequence is set as ROT [3:2]=Q [0:1], and a lower bit sequence is set as ROT [1:0]=Q [2:3], is inputted.

Referring to FIGS. 16A and 16B and FIGS. 17A and 17B, an example of operations of the order setting circuit 250 will be described in detail. FIG. 16A shows an example of operations when HC [2:0]=0.

As indicated by H1 in FIG. 16A, when MC [2:0]=1, Q [2:0]=1 is outputted as indicated by H2. In the case of a binary number, Q [2:0]=(0, 0, 1), and therefore ROT [2:0]=Q [0:2] =(1, 0, 0). Then, as indicated by H3, ROT [2:0]=4 is outputted.

Similarly, as indicated by H4 in FIG. 16B, when HC [2:0] =0, ROT [2:0]=4, 2, 6, . . . is outputted corresponding to MC [2:0]=1, 2, 3, . . . . Also, as indicated by H5, when HC [2:0]=1, ROT [2:0]=4, 2, 6, . . . is outputted corresponding to MC [2:0]=0, 1, 2, . . . . In this manner, with counting up (or counting down) of HC [2:0], ROT [2:0] is shifted in rotation with respect to MC [2:0].

In this manner, the order of driving pixels can be set. Then, by generating rotation data ROT [2:0], the pixel driving order can be shifted in rotation.

FIG. 17A shows an example of operations of the decoder 330. For example, when the count value MC [2:0]=1, an order instruction signal RS1 corresponding to the count value MC [2:0]=1 is made active, and other order instruction signals RS2-RS8 are made non-active. In this manner, the order instruction signals RS1-RS8 instructing the driving order of the first-the eighth places are outputted.

FIG. 17B shows an example of operations of the decoder 340. For example, when the count value HC [2:0]=1, a pixel selection signals OE1 corresponding to the count value HC [2:0]=1 is made active, and other pixel selection signals OE2-OE8 are made no-active. In this manner, the pixel selection signals OE1-OE8 instructing respectively to select the first pixel-the eighth pixel are outputted.

4.2. Output Selection Circuit

Figure 18:
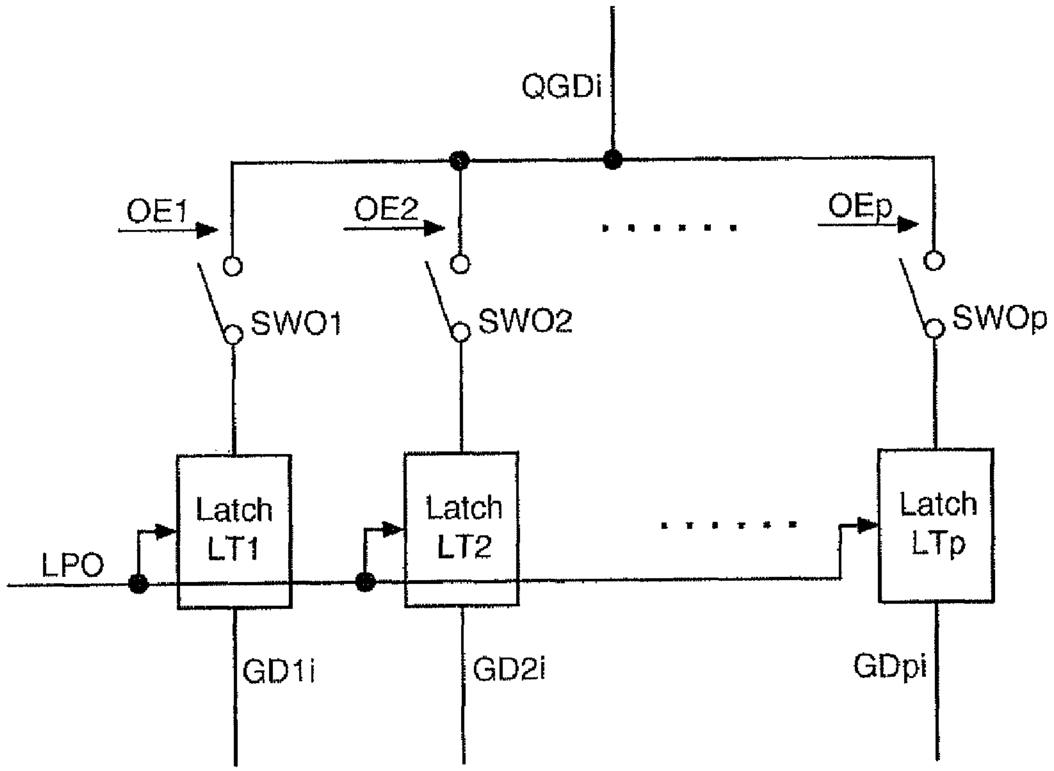
FIG. 18 is a diagram of an exemplary composition of an output selection circuit.

FIG. 18 shows an exemplary composition of the output selection circuit 220-*i*. This exemplary composition includes first—p-th latches LT1-LTp, and first—p-th switch elements SWO1-SWOp.

The latches LT1-LTp, upon receiving a latch pulse LPO from, for example, the display controller 40 shown in FIG. 1, latches image data GD1*i*-GDpi, respectively.

The switch elements SWO1-SWOp, upon receiving pixel selection signals OE1-OEp, are controlled to turn on and off by the pixel selection signals OE1-OEp, respectively. For example, when the pixel selection signal OE1 is made active, the switch element SWO1 turns on. Then, image data GD1*i* latched at the latch LT1 is outputted as selected image data QGDi.

In this manner, based on the pixel selection signals OE1-OEp (JS) from the order setting circuit 250, corresponding one of the image data GD1*i*-GDpi is selected and outputted.

4.3. Order Offset Addition Circuit and Position Offset Addition Circuit

Figure 19:
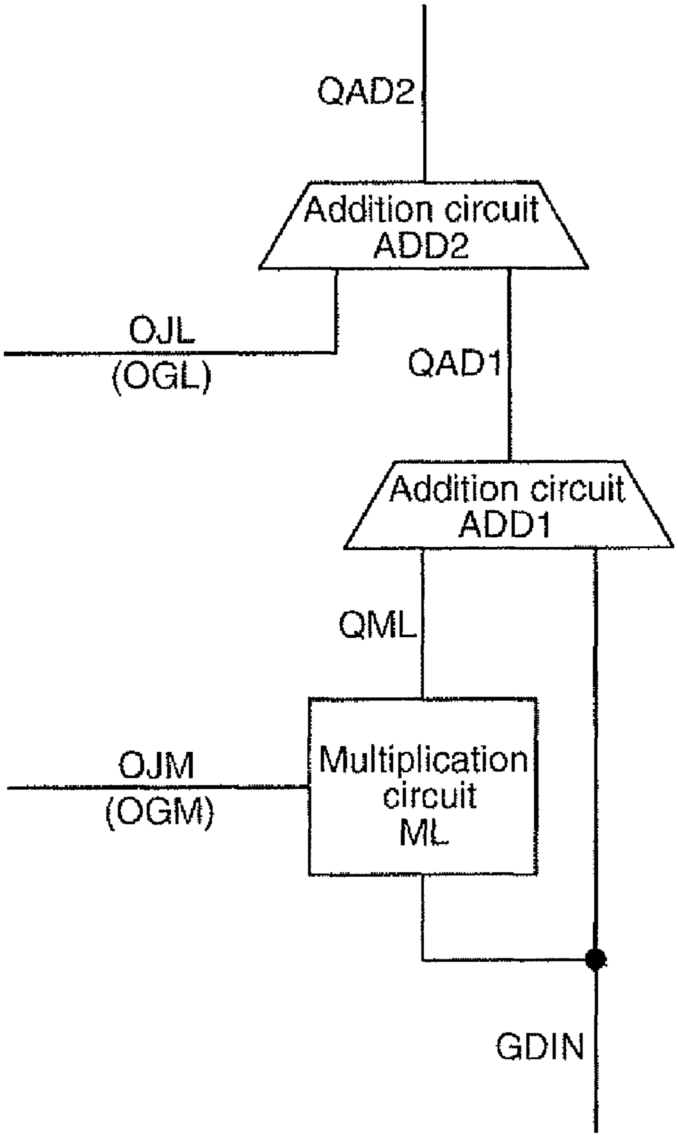
FIG. 19 is a diagram of an exemplary composition of a position offset addition circuit and an order offset addition circuit.

FIG. 19 shows an exemplary composition of the order offset addition circuit 260-*i*. The exemplary composition includes first and second addition circuits ADD1 and ADD2, and a multiplication circuit ML. As the order offset addition circuit 210-*i* can be composed in a similar manner, the position offset addition circuit 260-*i* will be described below as an example.

The multiplication circuit ML processes multiplication of image data GDIN and an order offset coefficient value OJM (or a position offset coefficient value OGM in the case of the position offset addition circuit), and outputs image data QML after the multiplication processing.

The addition circuit ADD1 processes addition of the image data GDIN and image data QML, and outputs addition-processed image data QAD1.

The addition circuit ADD2 processes addition of the image data QAD1 to an order offset constant value OJL (a position offset constant value OGL), and outputs addition-processed image data QAD2.

In this manner, addition of the order offset constant value OJL (the position offset constant value OGL) to the image data GDIN can be processed. Also, addition of a value obtained by multiplying image data GDIN with the order offset coefficient value OJM (the position offset coefficient value OGM) to the image data GDIN can be processed.

Figure 20:
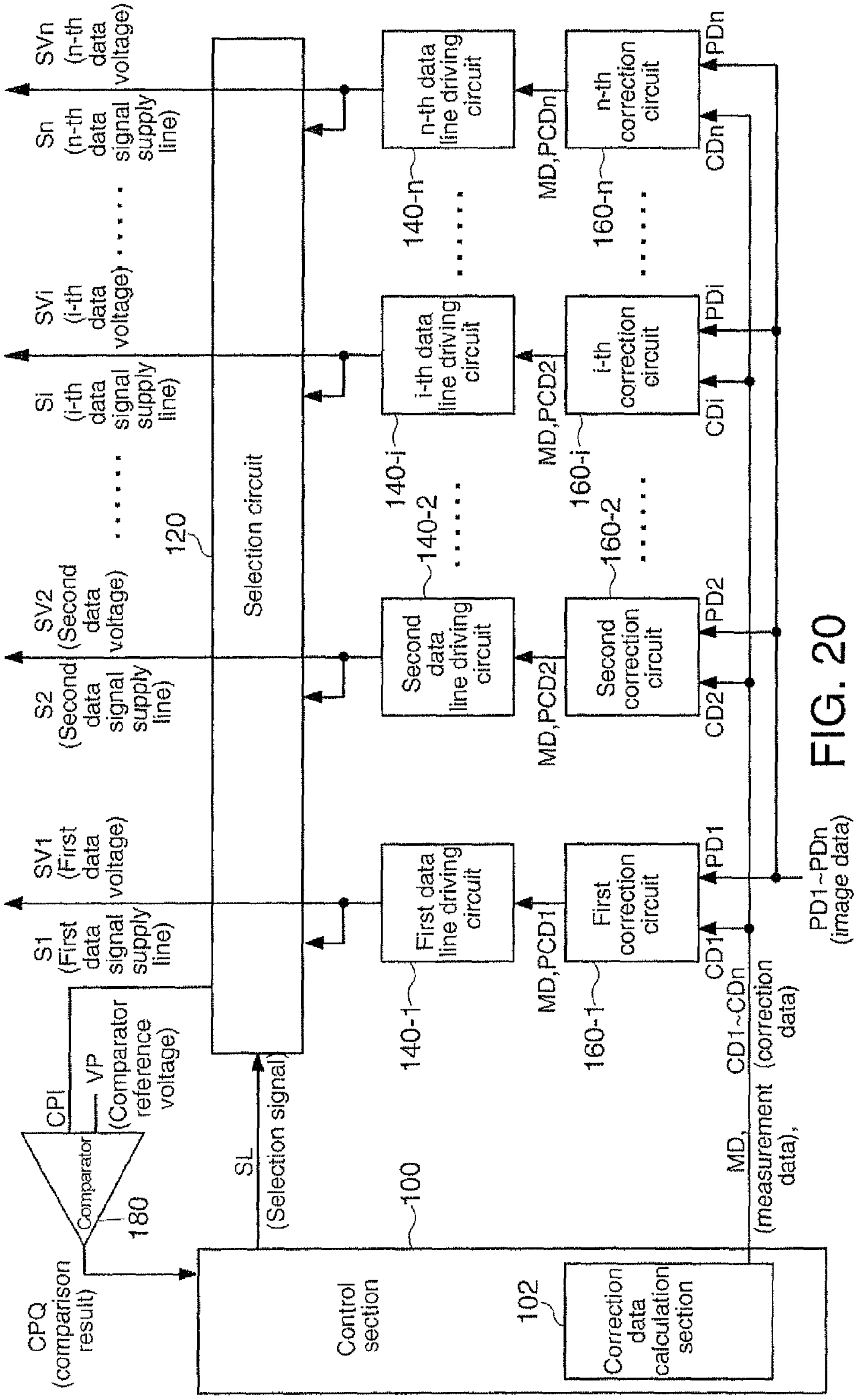
FIG. 20 is a diagram of a fourth exemplary composition in accordance with an embodiment of the invention.

5. Correction of Variation in Output Voltages of Data Line Driving Circuit 5.1. Exemplary Composition FIG. 20 shows a fourth exemplary composition of the present embodiment. The fourth exemplary composition includes first—n-th data line driving circuits 140-1-140-*n* (a plurality of data line driving circuits), first—n-th correction circuits 160-1-160-*n* (a plurality of correction circuits), a comparator 180, a control section 100, and a selection section 120. The control section 100 may include a correction data calculation section 102. It is noted that it is possible to make many modifications to the exemplary composition, including omission of a portion of the components, addition of other components, changing connection relations and the like.

The fourth exemplary composition is a circuit that detects variations (deviations, errors) in output voltages (data voltages) of the data line driving circuit in real time to obtain correction data, and corrects image data based on the correction data, thereby correcting the variations in the output voltages of the data line driving circuit. For example, the fourth exemplary composition is capable of correcting in real time variations in output voltages of a data line driving circuit, which may be caused by offset variations of operation amplifiers, characteristic variations of DACs and the like.

Concretely, the fourth exemplary composition obtains, first—n-th correction data CD1-CDn for correction of variations in a correction data calculation mode, and processes correction of first—n-th image data PD1-PDn with the correction data CD1-CDn in a normal operation mode.

First, the correction data calculation mode is described. The correction data calculation mode is executed, for example, in a period in which an image is not displayed at the beginning (or the last) of a vertical scanning period (non-display period), or in a period in which image display is not performed at the time of power on of an electronic apparatus (display preparation period).

In the correction data calculation mode, the correction data calculation section 102 outputs measurement data MD that is sequentially changed in a predetermined range to the correction circuits 160-1-160-*n*. For example, the correction data calculation section 102 sequentially outputs measurement grayscale data MGD1-MGDk (k is a natural number) one by one as the measurement data MD.

Upon receiving the measurement data MD from the correction data calculation section 102, the correction circuits 160-1-160-*n* output the measurement data MD to the data line driving circuits 140-1-140-*n*.

The data line driving circuits 140-1-140-*n*, upon receiving the measurement data MD, output data voltages corresponding to the measurement data MD as first—n-th data voltages SV1-SVn.

The selection circuit 120, upon receiving a selection signal SL from the control section 100, selects a data voltage to be corrected from among the data voltages SV1-SVn (a data voltage outputted from a data line driving circuit to be corrected), and outputs the data voltage.

In the comparator 180, the data voltage to be corrected is inputted from the selection circuit 120 as a comparator input voltage CPI. The comparator 180 compares the comparator input voltage CPI with a comparator reference voltage VP, and outputs a comparison result CPQ.

The correction data calculation section 102, upon receiving the comparison result CPQ from the comparator 180, calculates correction data for calculation among the correction data CD1-CDn (correction data corresponding to the data line driving circuit to be corrected). The timing for correction data calculation is controlled by the control section 100.

The correction data calculation section 102 may obtain one correction data (a part of correction data among the correction data CD1-CDn) in one horizontal scanning period as the correction data to be calculated. For example, the correction data calculation section 102 may obtain correction data in a non-display period in each vertical scanning period, in a horizontal scanning period in the non-display period. Then, correction data may be obtained one by one in each vertical scanning period, and correction data CD1-CDn may be obtained in n times vertical scanning periods. Alternatively, the correction data calculation section 102 may obtain correction data CD1-CDn during n times horizontal scanning periods in one vertical scanning period.

Next, the normal operation mode is described. The normal operation mode is executed in a period in which image display is performed through inputting image data in each vertical scanning period.

In the normal operation mode, the correction circuits **160-1-160-*n* process correction of image data PD1-PDn based on the correction data CD1-CDn from the correction data calculation section 102, and output correction-processed image data PCD1-PCDn. In the correction circuits 160-1-160-*n* are inputted image data PD1-PDn from, for example, a multiplex circuit 28 shown in FIG. 2. Then, time-division multiplexed image data are inputted in the correction circuits 160-1-160-*n* as the image data PD1**-PDn, respectively.

The data line driving circuits **140-1-140-*n*, upon receiving the correction-processed image data PCD1-PCDn, output data voltages SV1-SVn corresponding to the correction-processed image data PCD1-PCDn to the data signal supply lines S1**-Sn, respectively.

5.2. Correction Data Calculation

Figure 21A:
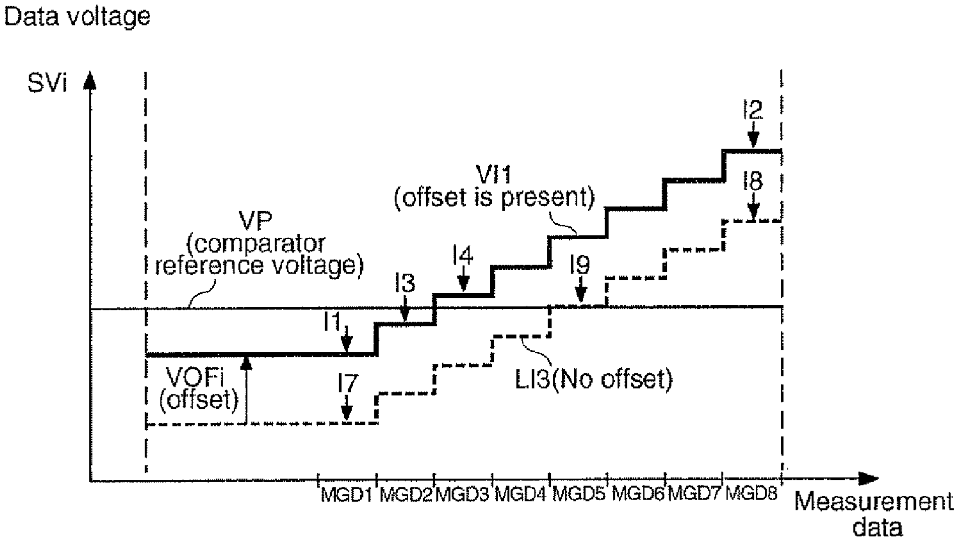
FIGS. 21A and 21B are graphs for describing correction data calculation operation.
Figure 21B:
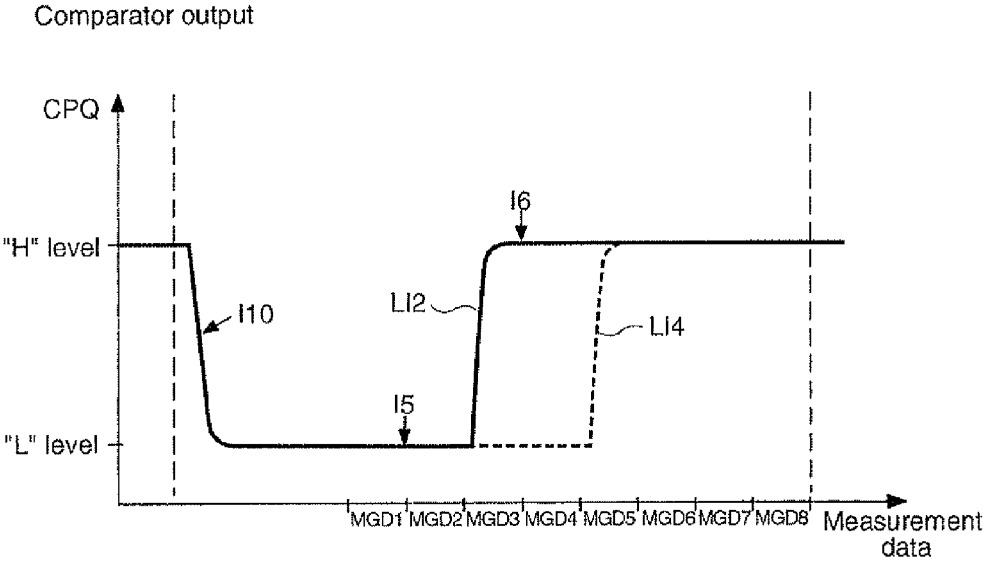

Referring to FIGS. 21A and 21B, operations of the correction data calculation mode will be described in detail. It is noted that, in FIGS. 21A and 21B, the correction data calculation section 102 obtains correction data CDi (i is a natural number less than n) as the correction data to be calculated, and sequentially outputs measurement grayscale data MGD1-MGD8 (k=8) as the measurement data MD.

FIG. 21A schematically shows an example of the voltage waveform of the data voltage SVi as indicated by LI1. As indicated by LI1, as the measurement grayscale data MGD1-MGD8 are sequentially outputted, data voltages changing from a data voltage corresponding to MGD1 indicated by I1 to a data voltage corresponding to MGD8 indicated by I2 are sequentially outputted.

For example, let us assume that, as the data voltage corresponding to the measurement grayscale data MGD2, a voltage smaller than the comparator reference voltage VP is outputted, as indicated by I3. Also, let us assume that, as the data voltage SVi corresponding to the measurement grayscale data MGD3, a voltage greater than the comparator reference voltage VP is outputted, as indicated by I4.

FIG. 21B schematically shows an example of waveform of the comparison result CPQ given by the comparator 180, as indicated by LI2. With the measurement grayscale data MGD2, the data voltage SVi is smaller than the comparator reference voltage VP, such that L level (the first voltage level) is outputted as the comparison result CPQ, as indicated by I5 in FIG. 21B. Further, with the measurement grayscale data MGD3, the data voltage SVi is greater than the comparator reference voltage VP, such that H level (the second voltage level) is outputted as the comparison result CPQ, as indicated by I6.

The correction data calculation section 102 detects an edge that changes from the L level to the H level, and calculates correction data CDi based on the measurement grayscale data MGD3, at which an edge is detected.

Let us now assume that no variation due to an offset or the like is present in the data voltage SVi. In this case, as indicated by LI3 in FIG. 21A, data voltages from a data voltage indicated by I7 to a data voltage indicated by I8 are sequentially outputted as an ideal data voltage SVi. Then, as indicated by LI4 in FIG. 21B, a comparison result CPQ with an edge is outputted at the time of the measurement grayscale data MGD5, and correction data CDi is calculated based on the measurement grayscale data MGD5.

In this instance, for example, correction data CDi=0 is calculated based on the measurement grayscale data MGD5. On the other hand, when the data voltage includes a variation VOFi (offset) as indicated by LI1 in FIG. 21A, correction data CDi=MGD3-MGD5 is calculated based on the measurement grayscale data MGD3.

As this correction data CDi=MGD3-MGD5 corresponds to the variation VOFi, the variation VOFi (offset) is corrected by correcting the image data with the correction data CDi=MGD3-MGD5.

In this manner, in the correction data calculation mode, data voltages are measured, and correction data CD1-CDn can be obtained.

The above description has been made, assuming that CDi=0 is obtained as the correction data CDi based on the measurement grayscale data MGD5. However, in accordance with the invention, as the correction data CDi based on the measurement grayscale data MGD5, correction data other than CDi=0 may be obtained. For example, as the correction data CDi, CDi=MGD5 may be obtained, or as the correction data CDi, data calculated by adding or subtracting predetermined data with respect to MGD5 may be obtained.

For the measurement data MD that are outputted in a predetermined range (for example, measurement grayscale data MGD1-MGD8), a voltage within the range of data voltages corresponding to the measurement data MD is set as the comparator reference voltage VP. For example, as indicated in FIG. 21A, an ideal data voltage for the measurement grayscale data MGD 5 is set as the comparator reference voltage VP. The comparator reference voltage VP may be supplied from the power supply circuit 50 shown in FIG. 1, for example, or may be provided through dividing the voltage supplied from the power supply circuit 50 with resistances.

It is noted that, when output voltages of the data line driving circuits **140-1-140-*n*** have variations, there is a problem in that the luminance varies in each image region that is driven by each of the data line driving circuits, such that luminance irregularities and color irregularities are generated in displayed images.

In this respect, in accordance with the present embodiment, the comparator 180 compares the output voltages SV1-SVn of the data line driving circuits **140-1-140-*n* with the comparator reference voltage VP, the correction data calculation section 102 calculates, based on the comparison result CPQ, correction data CD1-CDn for correcting variations in the output voltages SV1-SVn, the correction circuits 160-1-160-*n* correct the image data PD1-PDn based on the correction data CD1-CDn, and the data line driving circuits 140-1-140*n*, upon receiving correction-processed image data PCD1-PCDn, drive the data signal supply lines S1**-Sn.

In accordance with the present embodiment, as the correction circuits **160-1-160-*n* correct the image data PD1-PDn based on the correction data CD1-CDn, variations in the output voltages SV1**-SVn of the data line driving circuits

**140-1-140-*n* can be corrected. By this, it is possible to prevent display irregularities due to variations in output voltages SV1-SVn of the data line driving circuits 140-1-140-*n***.

Also, in accordance with the present embodiment, the comparator 180 compares the output voltages SV1-SVn of the data line driving circuits **140-1-140-*n* with the comparator reference voltage VP, and the correction data calculation section 102 calculates, based on the comparison result CPQ, correction data CD1-CDn for correcting variations in the output voltages SV1-SVn. By so doing, correction data can be obtained while measuring variations in real time. Accordingly, when the characteristics of drivers and liquid crystal display devices have been deteriorated with time after shipment, variations in output voltages SV1**-SVn can be corrected in real time.

5.3. Detailed Exemplary Composition

Figure 22:
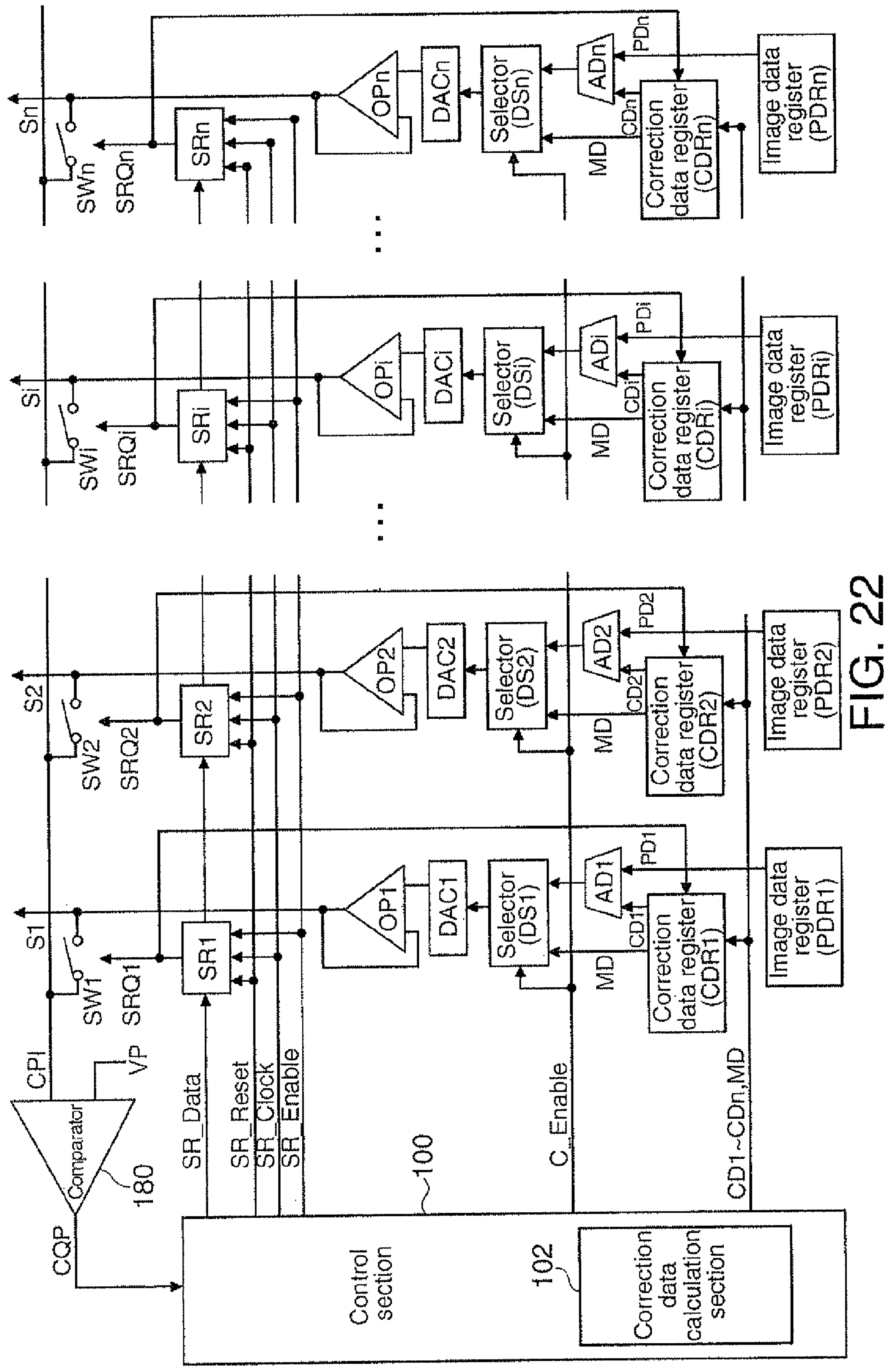
FIG. 22 is a diagram of an exemplary composition in detail in accordance with an embodiment of the invention.

FIG. 22 shows an exemplary composition in detail of the present embodiment. It is noted that components that are the same as those described with reference to FIG. 20, etc., such as, the comparator and the like, will be appended with the same signs, and their description will be omitted if appropriate. Also, the present embodiment is not limited to the structure shown in FIG. 22, and a variety of modifications can be made, such as, omission of a part of the compositions (for example, shift registers, selectors and the like), addition of other components, and the like.

The exemplary composition shown in FIG. 22 includes switches SW1-SWn, shift registers SR1-SRn, operational amplifiers OP1-OPn, D/A converter circuits DAC1-DACn (data voltage generation circuits in a broader sense), selectors DS1-DSn (data switching circuits), addition circuits AD1-ADn (correction processing circuits in a broader sense), correction data registers CDR1-CDRn, image data registers PDR1-PDRn, a comparator 180, a control section 100, and a correction data calculation section 102.

In the example to be described below, it is assumed that correction data CDi is calculated as correction data for a data line driving circuit to be corrected in the correction data calculation mode.

The image data registers PDR1-PDRn retain image data PD1-PDn (grayscale data). For example, the image data PD1-PDn may be written from image data stored in a storage section of a RAM (Random Access Memory) or the like in a batch to the image data registers PDR1-PDRn, or their streamed data may be received through an I/F circuit and sequentially written in the image data registers PDR1-PDRn.

The correction data registers CDR1-CDRn retain measurement data MD and correction data CD1-CDn given from the correction data calculation section 102. After correction data CDi has been obtained in the correction data calculation mode, the correction data CDi given from the correction data calculation section 102 is set at the correction data register CDRi. The correction data CDi is set at the correction data register CDRi, when the output of the shift register SRi is active. It is noted that the correction data registers CDR1-CDRn may be set with initial values of the correction data CD1-CDn given from an unshown host controller.

The addition circuits AD1-ADn process correction by adding correction data CD1-CDn to the image data PD1-PDn, respectively, and output correction-processed image data PCD1-PCDn. It is noted that the addition circuits AD1-ADn may perform, as the addition processing, addition processing with addition or multiplication with another coefficient.

Upon receiving measurement data MD and image data PCD1-PCDn, the selectors DS1-DSn select either of them, and output the selected data as output data. Concretely, the selectors DS1-DSn select the measurement data MD in the correction data calculation mode, and the image data PCD1-PCDn in the normal operation mode. For example, the selectors DS1-DSn select data based on a correction enable signal C_Enable given from the control circuit 100.

The D/A converter circuits DAC1-DACn, upon receiving the output data from the selectors DS1-DSn, output grayscale voltages corresponding to the output data.

The operational amplifiers OP1-OPn buffer grayscale voltages from the D/A converter circuits DAC1-DACn, and output the buffered grayscale voltages as data voltages SV1-SVn. For example, as shown in FIG. 22, the operational amplifiers OP1-OPn may be connected in a voltage follower manner.

The shift registers SR1-SRn output switching control signals SRQ1-SRQn that control switching ON and OFF of the switches SW1-SWn. Concretely, the shift registers SR1-SRn acquire SR_Data at H level (first logical level) from the control section 100, and sequentially shift SR_Data at H level based on SR_Clock given from the control section 100, thereby outputting switch control signals SRQ1-SRQn that sequentially become active. When correction data CDi is calculated, the shift register SRi outputs a switching control signal SRQi that is active.

The switches SW1-SWn turn ON and OFF based on switching control signals SRQ1-SRQn from the shift registers SR1-SRn. Concretely, the switches SW1-SWn turn ON when the signals from the shift registers SR1-SRn are active, and turn OFF when they are non-active. When correction data CDi is to be obtained, the switch SWi turns ON, and the data voltage SVi is inputted as a comparator input voltage CPI in the comparator 180.

The control section 100 outputs shift data SR_Data, a reset signal SR_Reset for the shift registers SR1-SRn, a clock SR_Clock for the shift registers SR1-SRn to acquire the shift data, an enable signal SR_Enable to determine the period for the shift registers SR1-SRn to output an active signal, and a correction enable signal C_Enable for the selectors DS1-DSn to output measurement data MD in the correction data calculation mode.

6. Data Driver

Figure 23:
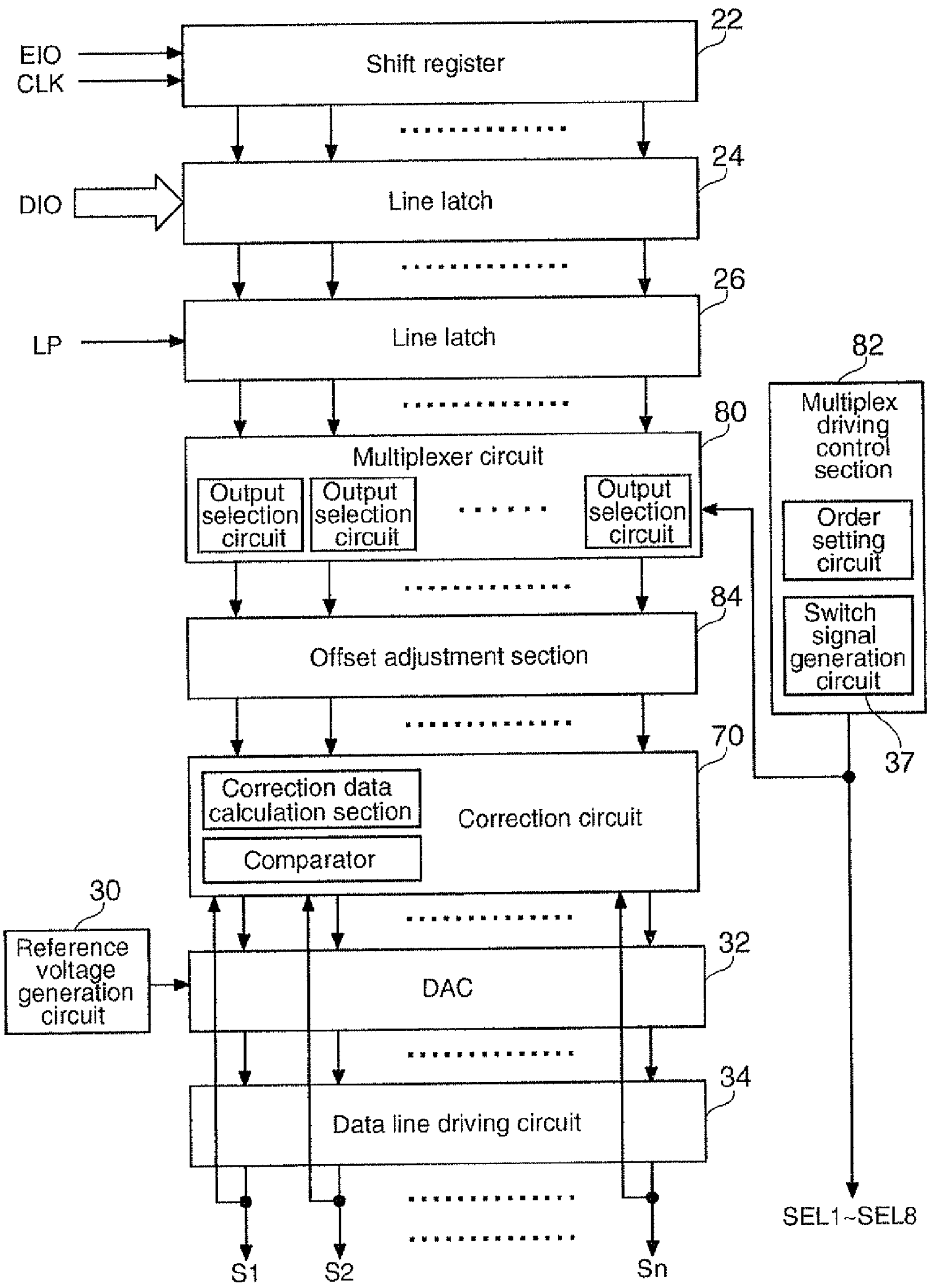
FIG. 23 is a modification example of the data driver.

FIG. 23 shows a modified example of a data driver. The data driver shown in FIG. 23 is applicable, for example, to the data driver 20 described above with reference to FIG. 1.

The modified example shown in FIG. 23 includes a shift register 22, line latches 24, 26, a multiplexer circuit 80, an offset adjustment section 84, a correction circuit 70, a reference voltage generation circuit 30, a DAC 32, a data line driving circuit 34, and a multiplex drive control section 82. It is noted that components to be described below that are the same as those described with reference to FIG. 2 or the like, such as, the data line driving circuits and the like, are appended with the same reference numbers, and their description may be omitted if appropriate.

The multiplex drive control section 82 may include an order setting circuit described above with reference to FIG. 7, FIG. 12, etc. Then, the multiplex drive control section 82 generates multiplex control signals SEL1-SEL8 (SEL1-SELp), based on a driving order set by the order setting circuit.

The multiplexer circuit 80 may include output selection circuits described with reference to FIG. 7, FIG. 12, etc., corresponding to the data signal supply lines, respectively. The output selection circuits select and output image data, based on the multiplex control signals SEL1-SEL8 given from the multiplex drive control section 82.

The offset adjustment section 84 processes correction of position offsets and order offsets. The offset adjustment section 84 may include a position offset register, a position offset addition circuit, an order offset register, and an order offset addition circuit, described above with reference to FIG. 7, FIG. 12, etc.

The correction circuit 70 performs processing to correct variations in output voltages of the data line driving circuits. The correction circuit 70 may include a correction data calculation section and a comparator described above with reference to FIG. 20, etc. Then, the correction circuit 70, upon receiving data voltages from the data line driving circuit 34, calculates correction data, and process correction of the image data based on the correction data.

In this manner, the data lines can be driven with outputs of data voltages in which position offsets, order offsets and variations in output voltages of the data line driving circuits are corrected.

7. Electronic Apparatus

Figure 24:
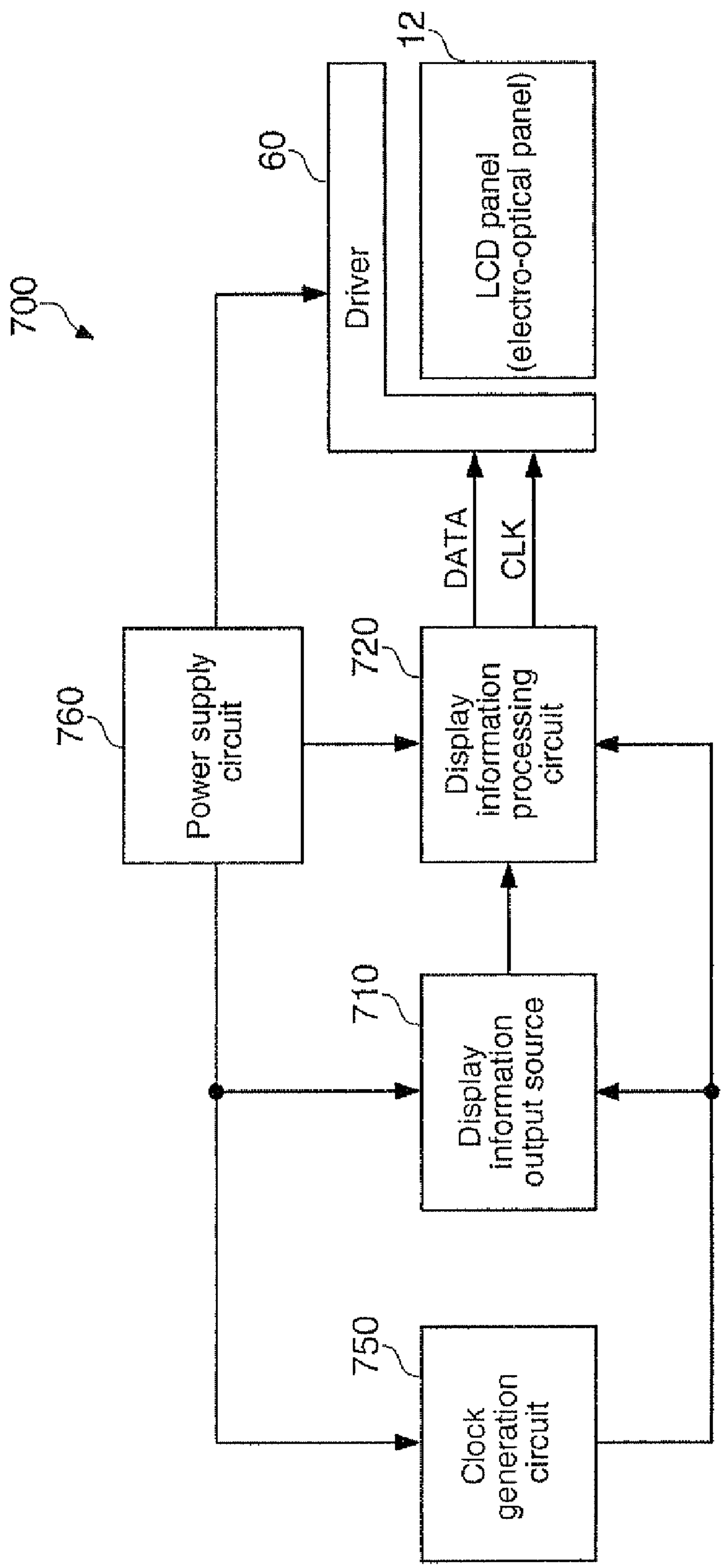
FIG. 24 is an exemplary composition of a projector.

FIG. 24 shows an exemplary composition of a projector (an electronic apparatus) to which the integrated circuit device in accordance with the present embodiment is applied.

The projector 700 (a projection type display device) includes a display information output source 710, a display information processing circuit 720, a driver 60 (a display driver), a liquid crystal panel 12 (an electro-optical panel in a broader sense), a clock generation circuit 750 and a power supply circuit 760.

The display information output source 710 includes a memory device, such as, a read only memory (ROM), a random access memory (RAM), an optical disc device or the like, and a tuning circuit for tuning and outputting image signals. The display information output source 710 outputs display information such as image signals in a predetermined format and the like to the display information processing circuit 720 based on a clock signal given from the clock generation circuit 750.

The display information processing circuit 720 may include an amplification-polarity inversion circuit, a phase expansion circuit, a rotation circuit, a gamma correction circuit, a clamping circuit, and the like.

The driver 60 includes a scanning driver (a gate driver) and a data driver (a source driver), and drives the liquid crystal panel 12 (an electro-optical panel). The power supply circuit 760 supplies power to each of the circuits described above.

It is noted that, although some embodiments of the invention have been described in detail above, those skilled in the art would readily appreciate that many modifications are possible in the embodiments without departing in substance from the novel matter and effects of the invention. Accordingly, such modifications are deemed to be included within the scope of the invention. For example, throughout the specification and the drawings, any terms (liquid crystal display device, liquid crystal panel, driver, source voltage, source line, gate line and the like) described at least once with other different terms (electro optical device, electro optical panel, integrated circuit device, data voltage, data line, scanning line and the like) that encompass broader meaning or are synonymous can be replaced with these different terms in any sections of the specification and the drawings. Also, the structures and operations of the integrated circuit devices, the electro optical devices, the electronic apparatuses and the like are not limited to those described in the present embodiments, and many modifications can be made.

What is claimed is:

1. An integrated circuit device comprising:

a data line driving circuit that is provided for each of a plurality of data signal supply lines and supplies a multiplexed data signal to a corresponding data signal supply line among the plurality of data signal supply lines;

an order offset register that stores a first order offset setting value—a p-th order offset setting value corresponding to order offsets that are offsets generated in a plurality of data signals, depending on an order of driving a first pixel—a p-th pixel, when a plurality of data signals after demultiplexing obtained by demultiplexing the multiplexed data signal with a demultiplexer are supplied to a plurality of pixels in one horizontal scanning period;

an order setting circuit that sets an order of driving the first pixel—the p-th pixel by outputting an order instruction signal instructing to select a pixel in an r-th (r is a natural number less than p) place in the order;

an order offset addition circuit corresponding to the data line driving circuit, wherein, when the data line driving circuit drives, among the first pixel—the p-th pixel, a q-th (q is a natural number less than p) pixel in the r-th place in the order, the order offset addition circuit processes addition of an order offset correction value based on the r-th order offset setting value among the first order offset setting value—the p-th order offset setting value to the q-th image data among the first image data—the p-th image data; and a multiplex counter that counts the number of clocks of a demultiplexing clock for demultiplexing, a horizontal synchronization counter that counts the number of horizontal synchronization signals, an addition circuit that processes addition of a count value of the multiplex counter and a count value of the horizontal synchronization counter and outputs an added count value, and a decoder that, upon receiving rotation data in which a lower bit sequence of the added count value is inverted to an upper bit sequence and an upper bit sequence of the added count value is inverted to a lower bit sequence, decodes the rotation data, and outputs the pixel selection signal.

2. An integrated circuit device according to claim 1, further comprising a switch signal generation circuit that generates a demultiplexing switch signal for controlling on and off of a plurality of demultiplexing switch elements included in the demultiplexer.

3. An integrated circuit device according to claim 1, wherein the order offset register stores a first order offset constant value—a p-th order offset constant value as the first order offset setting value—the p-th order offset setting value, and the order offset addition circuit processes addition of the r-th order offset constant value among the first order offset constant value—the p-th order offset constant value as the order offset correction value to the q-th image data.

4. An integrated circuit device according to claim 1, wherein the order offset register stores a first order offset coefficient value—a p-th order offset coefficient value as the first order offset setting value—the p-th order offset setting value, and the order offset addition circuit processes addition of a value obtained by multiplying the r-th order offset coefficient value among the first order offset coefficient value—the p-th order offset coefficient value with the q-th image data, as the order offset correction value, to the q-th image data.

5. An integrated circuit device according to claim 1, further comprising an output selection circuit that is provided corresponding to the data line driving circuit and selects and outputs, based on a pixel selection signal from the order setting circuit, image data among the first image data—the p-th image data, wherein, when the data line driving circuit drives the q-th pixel in the r-th place in the order, the output selection circuit, upon receiving the pixel selection signal instructing to select the q-th pixel, outputs the q-th image data, and the order offset addition circuit processes addition of an order offset correction value based on the r-th order offset setting value to the q-th image data.

6. An integrated circuit device according to claim 1, further comprising a correction data calculation section that calculates correction data for correcting variations in output voltages of the plurality of data line driving circuits, a plurality of correction circuits that correct image data based on the correction data and outputs the image data corrected to corresponding data line driving circuits among the plurality of data line driving circuits, and a comparator, wherein the comparator compares an output voltage of one of the data line driving circuits to be corrected among the plurality of data line driving circuits with a comparator reference voltage, and the correction data calculation section calculates the correction data for correcting variation in the output voltage of the data line driving circuit to be corrected based on comparison results provided by the comparator.

7. An electro optical device comprising the integrated circuit device recited in claim 1.

8. An electro optical device according to claim 7, further comprising:

an electro optical panel, wherein the electro optical panel includes a plurality of pixels that are supplied with a plurality of data signals after demultiplexing, the plurality of data lines corresponding to the plurality of pixels, a plurality of demultiplexing switch elements for demultiplexing the multiplexed data signal, and a plurality of signal lines that are arranged in a first direction for controlling on and off of the plurality of demultiplexing switch elements.

9. An electronic apparatus comprising the electro optical device according to claim 7.

10. An electronic apparatus comprising the electro optical device according to claim 8.

* * * * *